United States Patent
Kogawara et al.

(10) Patent No.: US 10,625,417 B2
(45) Date of Patent: *Apr. 21, 2020

(54) CONTROL SYSTEM, SETTING DEVICE, SETTING METHOD, AND STORAGE DEVICE

(71) Applicant: OMRON Corporation, Kyoto (JP)

(72) Inventors: Toru Kogawara, Kyoto (JP); Igor Jovanovic, Barcelona (ES); Diego Escudero-Rodrigo, Barcelona (ES); Ferran Carlas Ponce, Barcelona (ES); Raffaele Vito, Barcelona (ES); Sandra Pallarés Gual, Barcelona (ES)

(73) Assignee: OMRON Corporation, Kyoto (JP)

( * ) Notice: Subject to any disclaimer, the term of this patent is extended or adjusted under 35 U.S.C. 154(b) by 277 days.

This patent is subject to a terminal disclaimer.

(21) Appl. No.: 15/844,633

(22) Filed: Dec. 18, 2017

(65) Prior Publication Data

US 2018/0250816 A1    Sep. 6, 2018

(30) Foreign Application Priority Data

Mar. 3, 2017    (JP) .................................. 2017-040667

(51) Int. Cl.
*B25J 9/16*    (2006.01)
*B25J 9/04*    (2006.01)

(52) U.S. Cl.
CPC .............. *B25J 9/1666* (2013.01); *B25J 9/04* (2013.01); *G05B 2219/39085* (2013.01);
(Continued)

(58) Field of Classification Search
CPC ....... B25J 9/16; B25J 9/04; B25J 9/166; B25J 21/00; B25J 15/0066; B25J 9/1661;
(Continued)

(56) References Cited

U.S. PATENT DOCUMENTS 9,444,004 B1 *  9/2016  Spence ................... H01L 31/18
2003/0131791 A1 *  7/2003  Schultz ............... B05B 13/0431
                                                              118/324
(Continued)

FOREIGN PATENT DOCUMENTS

DE    19625637    1/1998
EP    2353802    8/2011
(Continued)

OTHER PUBLICATIONS

Yu et al., Development of ARM-based Embedded System for Robot Applications, 2006, IEEE, p. 1-6 (Year: 2006).*
(Continued)

*Primary Examiner* — McDieunel Marc
(74) *Attorney, Agent, or Firm* — JCIPRNET

(57) ABSTRACT

A control system including a selective compliance assembly robot arm (SCARA) robot is provided. The SCARA robot includes a first arm configured to be rotatable around a first rotation shaft, a second arm configured to be rotatable around a second rotation shaft arranged parallel to the first rotation shaft and provided on the first arm, and a main shaft configured to be drivable in a direction parallel to the second rotation shaft and provided on the second arm. The control system includes a setting unit providing a user interface for receiving a setting of a two-dimensional operation prohibition region with respect to a point of interest on the SCARA robot. The operation prohibition region corresponds to an area on a plane orthogonal to the main shaft. The control system includes an extension unit two-dimensionally extending the operation prohibition region through an extension in a direction of the main shaft.

10 Claims, 14 Drawing Sheets

(52) U.S. Cl.
CPC ... *G05B 2219/40476* (2013.01); *Y10S 901/02* (2013.01); *Y10S 901/15* (2013.01); *Y10S 901/49* (2013.01)

(58) Field of Classification Search
CPC ........ B25J 9/1692; B25J 9/161; B25J 9/1633; Y01S 901/49; Y01S 91/02; G05B 19/409; B21D 43/18; B65G 47/90; B05B 13/02; B05B 13/04; H01L 31/18; H01L 31/041; B23Q 7/14; B23Q 1/54
See application file for complete search history.

(56) References Cited

U.S. PATENT DOCUMENTS

| | | | | |
|---|---|---|---|---|
| 2016/0288340 | A1* | 10/2016 | Akaha | B25J 21/00 |
| 2017/0239705 | A1* | 8/2017 | Takeda | B25J 9/009 |
| 2017/0336776 | A1* | 11/2017 | Watanabe | G05B 19/409 |
| 2018/0194010 | A1* | 7/2018 | Huang | B25J 9/1692 |
| 2018/0250817 | A1* | 9/2018 | Matsunaga | B25J 9/04 |
| 2018/0345495 | A1* | 12/2018 | Aldridge | B25J 9/0081 |

FOREIGN PATENT DOCUMENTS

| | | |
|---|---|---|
| JP | H0588743 | 4/1993 |
| JP | 2012254525 | 12/2012 |

OTHER PUBLICATIONS

Mizukawa et al., Multi-modal information-sharing teaching system in sensor-based robotics $structured description based on task properties that enables onsite-tuning by reflecting skills, 2002, IEEE, p. 1535-1540 (Year: 2002).*

Belhadj et al., KUKA robot control based Kinect image analysis, 2013, IEEE, p. 21-26 (Year: 2013).*

Buitrago et al., Remote access lab for Mitsubishi RV-2AJ robot, 2011, IEEE, p. 1-7 (Year: 2011).*

"Search Report of Europe Counterpart Application", dated Jun. 26, 2018, p. 1-p. 8.

* cited by examiner

CONTROL SYSTEM, SETTING DEVICE, SETTING METHOD, AND STORAGE DEVICE

CROSS-REFERENCE TO RELATED APPLICATION

This application claims the priority of Japan patent application serial no. 2017-040667, filed on Mar. 3, 2017. The entirety of the above-mentioned patent application is hereby incorporated by reference herein and made a part of this specification.

BACKGROUND

Technical Field

The disclosure relates to technology for setting an operation for a SCARA robot.

Description of Related Art

In the field of factory automation (FA), horizontal articulated robots referred to as selective compliance assembly robot arm (SCARA) robots have become widespread. A SCARA robot is a generic term for industrial robots in which a plurality of arms connected to each other operate on a horizontal plane.

In regard to such a robot, Japanese Unexamined Patent Application Publication No. 2012-254525 discloses a SCARA robot "capable of securing a wide movable range while maintaining response performance and positioning accuracy."

It is desirable to safely operate a SCARA robot. In regard to technology for safely operating a robot, Japanese Unexamined Patent Application Publication No. 05-88743 discloses a control device for an industrial robot "capable of automatically determining whether or not a robot is operable and safely performing work by stopping the robot outside a movable region."

A SCARA robot is controlled by a controller such as a PLC. In order to secure safety, the controller determines that the operation of the SCARA robot is abnormal on the basis of the fact that the arm of the SCARA robot has entered a preset operation prohibition region. Because this determination process is performed sequentially, a calculation time will be longer than expected if a shape of the operation prohibition region is complicated. Therefore, technology for setting a simpler operation prohibition region of the SCARA robot than in the past is desired.

SUMMARY

According to an aspect, a control system for a robot is provided. The robot includes a first rotation shaft; a first arm configured to be rotatable on a plane orthogonal to the first rotation shaft around the first rotation shaft; a second rotation shaft arranged parallel to the first rotation shaft and provided on the first arm; a second arm configured to be rotatable on a plane orthogonal to the second rotation shaft around the second rotation shaft; and a main shaft configured to be drivable in a direction parallel to the second rotation shaft and provided on the second arm. The control system includes a setting unit configured to provide a user interface for receiving a setting of a two-dimensional operation prohibition region with respect to a predetermined point of interest on the robot and the two-dimensional operation prohibition region corresponds to an area on a plane orthogonal to the main shaft. The control system further includes an extension unit configured to extend the two-dimensional operation prohibition region to a three-dimensional operation prohibition region by extending the two-dimensional operation prohibition region in a direction of the main shaft.

In an exemplary embodiment, a shape of the two-dimensional operation prohibition region capable of being set in the user interface includes a fan shape. The extension unit extends the two-dimensional operation prohibition region to the three-dimensional operation prohibition region so that a shape of the three-dimensional operation prohibition region on any plane orthogonal to the main shaft becomes a fan shape.

In an exemplary embodiment, the user interface is configured to receive a setting of a central angle of the fan shape.

In an exemplary embodiment, a shape of the two-dimensional operation prohibition region capable of being set in the user interface includes a polygon. The extension unit extends the two-dimensional operation prohibition region to the three-dimensional operation prohibition region so that a shape of the three-dimensional operation prohibition region on any plane orthogonal to the main shaft becomes a polygon.

In an exemplary embodiment, the extension unit determines a range of the three-dimensional operation prohibition region in a direction of the main shaft on the basis of at least one of a predetermined lower limit value in the direction of the main shaft and a predetermined upper limit value in the direction of the main shaft.

In an exemplary embodiment, the control system includes a stopping unit configured to stop driving of the robot when the predetermined point of interest is included in the three-dimensional operation prohibition region.

In an exemplary embodiment, the stopping unit stops the driving of the robot when the predetermined point of interest is not included in a predetermined operable region.

According to another aspect, a setting device for setting an operation of a robot is provided. The robot includes a first rotation shaft; a first arm configured to be rotatable on a plane orthogonal to the first rotation shaft around the first rotation shaft; a second rotation shaft arranged parallel to the first rotation shaft and provided on the first arm; a second arm configured to be rotatable on a plane orthogonal to the second rotation shaft around the second rotation shaft; and a main shaft configured to be drivable in a direction parallel to the second rotation shaft and provided on the second arm. The setting device includes a setting unit configured to provide a user interface for receiving a setting of a two-dimensional operation prohibition region with respect to a predetermined point of interest on the robot and the two-dimensional operation prohibition region corresponds to an area on a plane orthogonal to the main shaft. The setting device further includes an extension unit configured to extend the two-dimensional operation prohibition region to a three-dimensional operation prohibition region by extending the two-dimensional operation prohibition region in a direction of the main shaft; and a communication unit configured to transmit the three-dimensional operation prohibition region to a controller of the robot.

According to another aspect, a setting method of setting an operation of a robot is provided. The robot includes a first rotation shaft; a first arm configured to be rotatable on a plane orthogonal to the first rotation shaft around the first rotation shaft; a second rotation shaft arranged parallel to the first rotation shaft and provided on the first arm; a second arm configured to be rotatable on a plane orthogonal to the second rotation shaft around the second rotation shaft; and a main shaft configured to be drivable in a direction parallel to the second rotation shaft and provided on the second arm. The setting method includes the step of: displaying a user interface for receiving a setting of a two-dimensional operation prohibition region with respect to a predetermined point of interest on the robot. The two-dimensional operation prohibition region corresponds to an area on a plane orthogonal to the main shaft. The setting method further includes the steps of: extending the two-dimensional operation prohibition region to a three-dimensional operation prohibition region by extending the two-dimensional operation prohibition region in a direction of the main shaft; and transmitting the three-dimensional operation prohibition region to a controller of the robot.

According to another aspect, a computer-readable storage device including a setting program for setting an operation of a robot is provided. The robot includes a first rotation shaft; a first arm configured to be rotatable on a plane orthogonal to the first rotation shaft around the first rotation shaft; a second rotation shaft arranged parallel to the first rotation shaft and provided on the first arm; a second arm configured to be rotatable on a plane orthogonal to the second rotation shaft around the second rotation shaft; and a main shaft configured to be drivable in a direction parallel to the second rotation shaft and provided on the second arm. The setting program causes a computer to execute the step of: displaying a user interface for receiving a setting of a two-dimensional operation prohibition region with respect to a predetermined point of interest on the robot. The two-dimensional operation prohibition region corresponds to an area on a plane orthogonal to the main shaft. The setting program further causes the computer to execute the steps of: extending the two-dimensional operation prohibition region to a three-dimensional operation prohibition region by extending the two-dimensional operation prohibition region in a direction of the main shaft; and transmitting the three-dimensional operation prohibition region to a controller of the robot.

In an aspect, it is possible to set a simpler operation prohibition region of the SCARA robot than in the past.

The above-described and other features and aspects provided in one or more of the embodiments of the disclosure will become more apparent from the following detailed description related to the disclosure to be understood in relation to the accompanying drawings.

DESCRIPTION OF THE EMBODIMENTS

Hereinafter, embodiments according to the invention will be described with reference to the drawings. In the following description, the same parts and components are denoted by the same reference signs. Their names and functions are also the same. Therefore, detailed description thereof will not be repeated. Also, embodiments and modified examples described below may be selectively combined as appropriate.

First Embodiment

[A. System Configuration]

Figure 1:
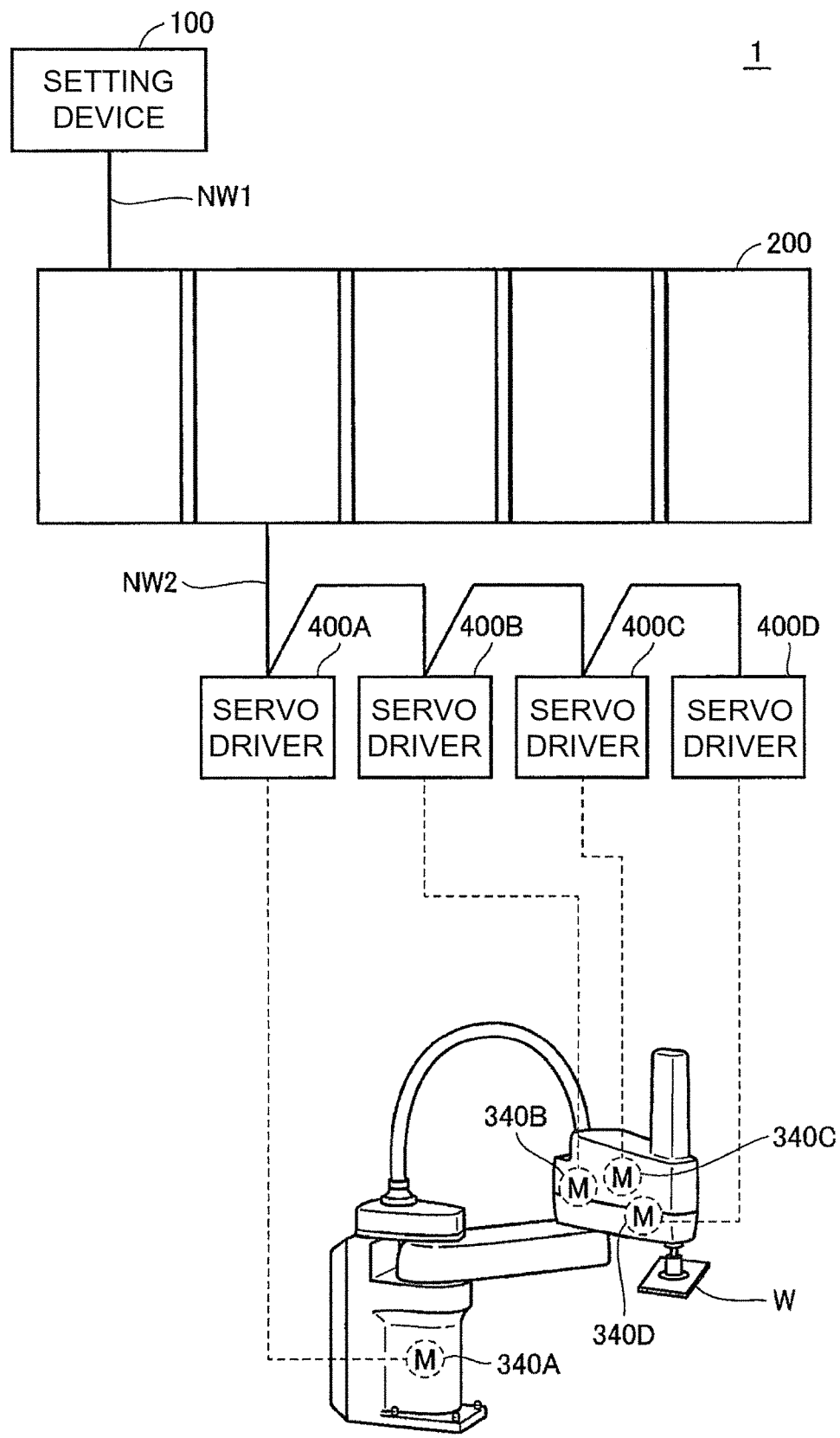
FIG. 1 is a schematic diagram illustrating an example of a configuration of a control system according to a first embodiment.

First, an example of a configuration of the control system 1 according to the present embodiment will be described. FIG. 1 is a schematic diagram illustrating an example of a configuration of a control system 1 according to the present embodiment.

Referring to FIG. 1, the control system 1 includes a setting device 100, a controller 200 such as a programmable logic controller (PLC), a plurality of drive devices, and a SCARA robot 300. In the example of FIG. 1, servo drivers 400A to 400D for driving servo motors 340A to 340D are exemplified as an example of a drive device. Hereinafter, the servo motors 340A to 340D are collectively referred to as a servo motor 340. The servo drivers 400A to 400D are collectively referred to as a servo driver 400. The drive device is not limited to the servo driver 400 and a corresponding drive device may be adopted in accordance with a motor which is a driven device. For example, if an induction motor or a synchronous motor is driven, an inverter drive or the like may be adopted as the drive device.

The setting device 100 is, for example, a terminal device such as a personal computer (PC), a tablet terminal, or a smartphone. The setting device 100 and the controller 200 are connected to a field network NW1. For example, EtherNET (registered trademark) may be adopted for the field network NW1. However, the field network NW1 is not limited to EtherNET and any communication means can be adopted. For example, the setting device 100 and the controller 200 may be directly connected by a signal line.

The controller 200 and the servo driver 400 are connected to a field network NW2 in a daisy chain. In the field network NW2, for example, EtherCAT (registered trademark) may be adopted. However, the field network NW2 is not limited to EtherCAT, and any communication means may be adopted. As an example, the controller 200 and the servo driver 400 may be directly connected by a signal line. Also, the controller 200 and the servo driver 400 may be integrally configured.

The servo driver 400 drives the servo motor 340 of the SCARA robot 300. An encoder (not illustrated) is arranged on a rotation shaft of the servo motor 340. The encoder outputs a position, a rotational speed, a cumulative rotational speed, or the like of the servo motor as a feedback value of the servo motor 340 to the servo driver 400. However, the feedback value from the servo motor 340 may be directly input to the controller 200

Also, although an example in which the control system 1 includes one controller 200 is illustrated in FIG. 1, the control system 1 may include a plurality of controllers 200. Also, although an example in which the control system 1 includes one SCARA robot 300 is illustrated in FIG. 1, the control system 1 may include a plurality of SCARA robots 300. Also, although an example in which the controller 200 and the servo driver 400 are directly connected is illustrated in FIG. 1, a robot controller or the like may be provided between the controller 200 and the servo driver 400.

[B. Device Configuration of SCARA Robot]

Figure 2:
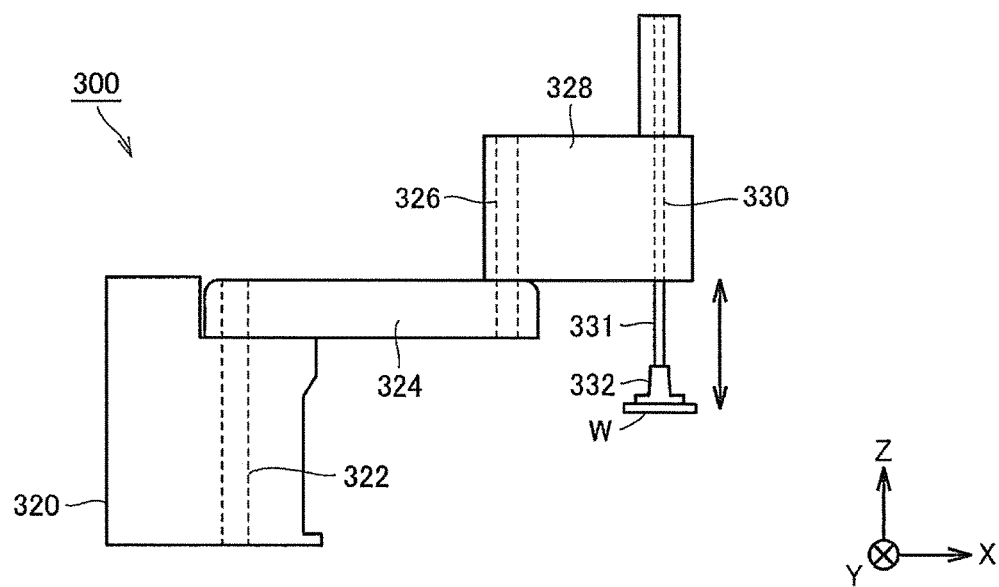
FIG. 2 is a side view of a SCARA robot according to the first embodiment.
Figure 3:
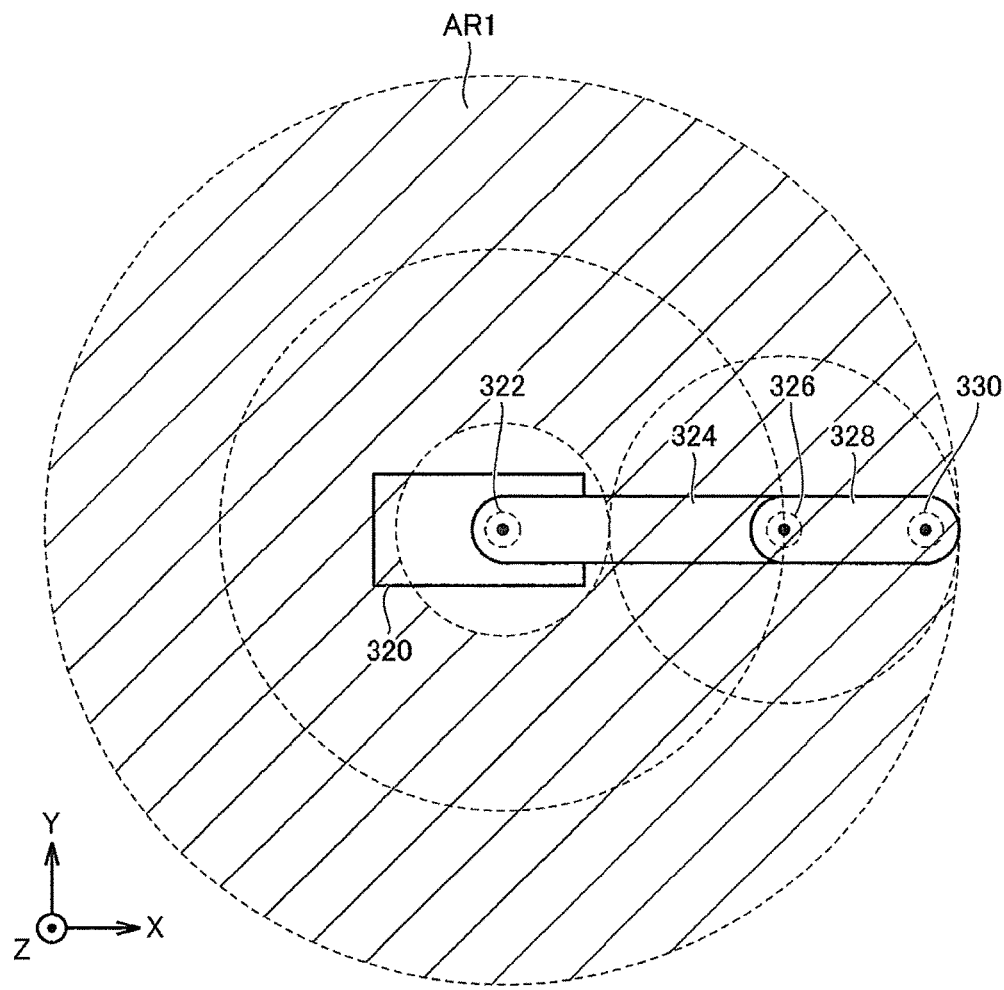
FIG. 3 is a plan view of the SCARA robot according to the first embodiment.

The SCARA robot 300 will be described with reference to FIGS. 2 and 3. FIG. 2 is a side view of the SCARA robot 300. FIG. 3 is a plan view of the SCARA robot 300.

The SCARA robot 300 includes a base 320, a first rotation shaft 322, a first arm 324, a second rotation shaft 326, a second arm 328, a third rotation shaft 330, a main shaft 331, and a work tool 332.

The SCARA robot 300 includes a base 320, a first rotation shaft 322, a first arm 324, a second rotation shaft 326, a second arm 328, and a third rotation shaft 330.

The base 320 and the first arm 324 are connected by the first rotation shaft 322. The first rotation shaft 322 is rotationally driven by the servo motor 340A (see FIG. 1). As a result, the first arm 324 is rotationally driven around the first rotation shaft 322.

The first arm 324 and the second arm 328 are connected by the second rotation shaft 326. More specifically, one end of the first arm 324 is connected to the base 320 via the first rotation shaft 322, and the other end of the first arm 324 is connected to the second arm 328 via the second rotation shaft 326. The second rotation shaft 326 is rotationally driven by the servo motor 340B (see FIG. 1). As a result, the second arm 328 is rotationally driven around the second rotation shaft 326. The first arm 324 and the second arm 328 are linked and rotationally driven, so that the second arm 328 can operate within an operable region AR1.

For convenience of description, a predetermined direction on the horizontal plane is hereinafter also referred to as an X direction. Also, a direction orthogonal to the X direction on the horizontal plane is also referred to as a Y direction. A direction orthogonal to the X direction and the Y direction is also referred to as a Z direction. That is, the Z direction corresponds to a vertical direction.

The main shaft 331 is configured to be drivable in a direction parallel to the second rotation shaft 326 (that is, the Z direction) by the servo motor 340C (see FIG. 1). Also, the main shaft 331 functions as a third rotation shaft and is rotationally driven by the servo motor 340D (see FIG. 1). That is, the main shaft 331 can be driven parallel to the Z direction and is configured to be rotatable around an axis in the Z direction.

At a distal end of the main shaft 331, the work tool 332 for performing predetermined work on a workpiece W is provided. The workpiece W is a product or a half-finished product. The work tool 332 functions as an end effector exerting an effect on the workpiece W. The work tool 332 is configured to be detachable from the main shaft 331. That is, at the distal end of the main shaft 331, an interface for connecting the work tool 332 is provided.

The work tool 332 is, for example, a pickup tool of the workpiece W. As an example, the pickup tool picks up the workpiece W by suctioning the workpiece W with a suction force. Alternatively, the pickup tool may pick up the workpiece W by grasping the workpiece W. As an example of work performed by the work tool 332, the work tool 332 may perform work of attaching the workpiece W such as a screw to a product conveyed on a conveyor. Alternatively, the work tool 332 may perform work of sequentially moving the workpiece W conveyed on a first conveyor to a container conveyed on a second conveyor.

[C. Operation of Control System 1]

Figure 4:
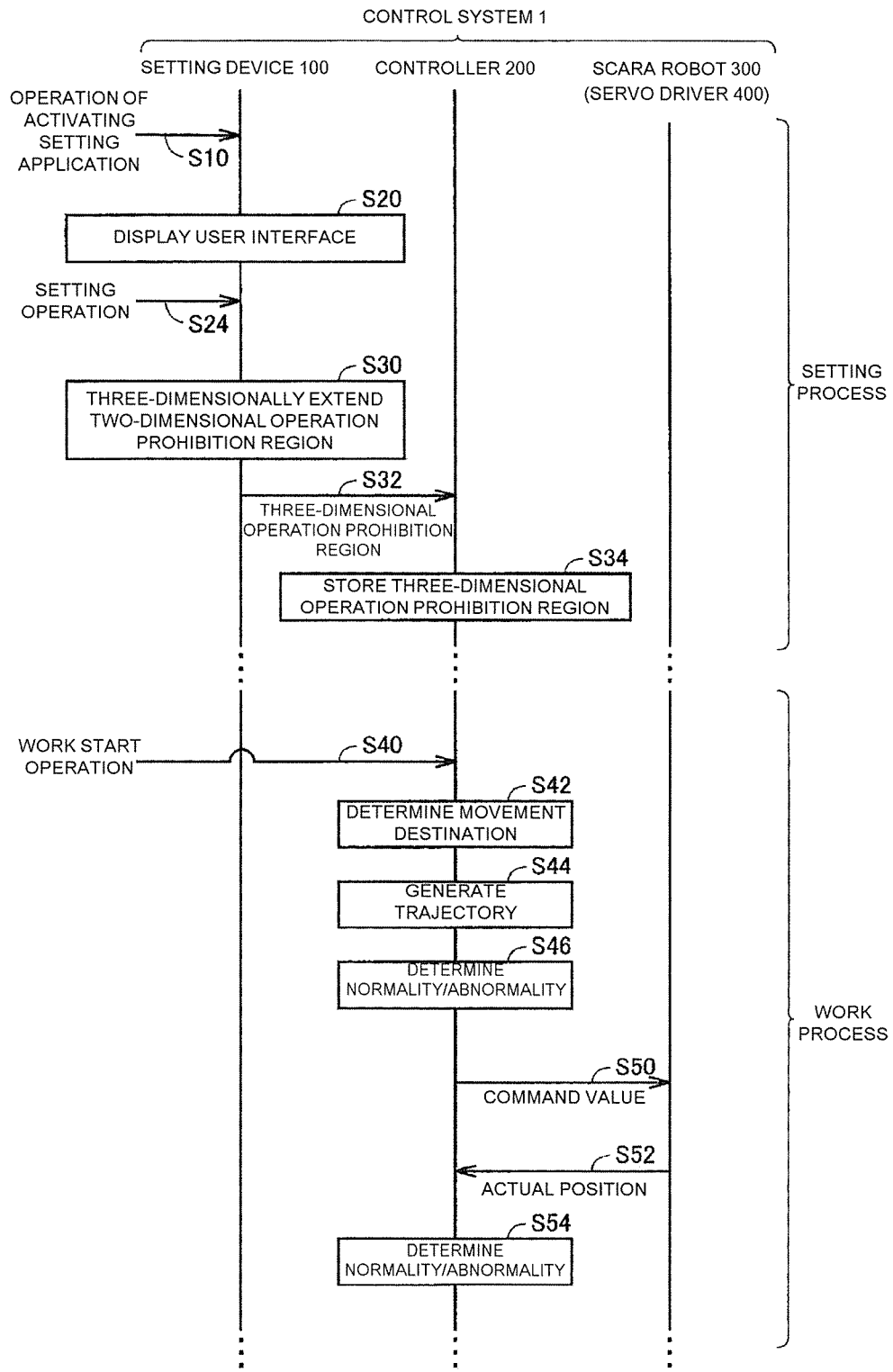
FIG. 4 is a sequence diagram illustrating a flow of data between devices constituting the control system according to the first embodiment.

An example of the operation of the control system 1 will be described with reference to FIGS. 4 to 7. FIG. 4 is a sequence diagram illustrating a flow of data between the devices constituting the control system 1.

As illustrated in FIG. 4, the control system 1 includes a setting process of the SCARA robot 300 and a work process of performing predetermined work on the workpiece W.

In the setting process, a user sets an operation prohibition region of the SCARA robot 300 with respect to the controller 200. Although details will be described below, the setting device 100 displays an image representing the SCARA robot 300 from the Z direction and the user can two-dimensionally set an operation prohibition region with respect to the image. The setting device 100 extends the two-dimensional operation prohibition region to a three-dimensional operation prohibition region by extending the set two-dimensional operation prohibition region in the Z direction. Thereafter, the setting device 100 sets the three-dimensional operation prohibition region in the controller 200. In this manner, the user can two-dimensionally set the operation prohibition region and an operation of setting the operation prohibition region is simplified.

In the work process, the SCARA robot 300 performs predetermined work on the workpiece. At this time, the controller 200 monitors whether or not a predetermined point of interest on the SCARA robot 300 has entered the operation prohibition region. If the point of interest has entered the operation prohibition region, the controller 200 determines that the operation of the SCARA robot 300 is abnormal.

As described above, because the three-dimensional operation prohibition region is obtained by extending the two-dimensional operation prohibition region in the Z direction, the three-dimensional operation prohibition region has a simple shape. Thus, the controller 200 can immediately determine whether or not the point of interest on the SCARA robot 300 is included in the three-dimensional operation prohibition region. Thereby, a calculation time is significantly shortened. If the point of interest has entered in the three-dimensional operation prohibition region, the controller 200 stops the operation of the SCARA robot 300.

Hereinafter, the setting process of the setting device 100 and the work process of the SCARA robot 300 will be described in detail.

(C1. Setting Process)

First, the setting process of the setting device 100 will be described with reference to FIGS. 4 to 6.

In the setting device 100, an application for setting an operation of the SCARA robot 300 is pre-installed. In step S10, the user is assumed to have activated the application.

In step S20, the setting device 100 displays a user interface for setting an operation of the SCARA robot 300. An example of the user interface will be described with reference to FIG. 5. FIG. 5 is a diagram illustrating the user interface 140 for setting the operation of the SCARA robot 300.

The user interface 140 displays an image schematically representing the SCARA robot 300. The image represents the SCARA robot 300 when viewed from the Z direction. More specifically, the user interface 140 includes an image 320A representing the base 320, an image 322A representing the first rotation shaft 322, an image 324A representing the first arm 324, an image 326A representing the second rotation shaft 326, an image 328A representing the second arm 328, and an image 330A representing the third rotation shaft 330.

Also, the user interface 140 displays the operable region AR1 of the SCARA robot 300. The operable region AR1 indicates a range in which a predetermined point of interest on the SCARA robot 300 is permitted to operate. Typically, because the operable region of the SCARA robot 300 is invariable, the operable region is preset when the SCARA robot 300 is designed or installed. The controller 200 determines whether or not the SCARA robot 300 is operating normally by designating whether or not the point of interest falls within the operable region AR1 as one basis of determination.

Also, the user interface 140 receives a setting of an operation prohibition region AR2 of the SCARA robot 300. That is, the user can arbitrarily set the operation prohibition region AR2 on the user interface 140. The number of operation prohibition regions AR2 capable of being set is arbitrary. As described above, because the first arm 324 and the second arm 328 operate on a horizontal plane (that is, an XY plane), the SCARA robot 300 represented from the Z direction is displayed on the user interface 140, so that the user can easily set the operation prohibition region AR2.

Figure 5:
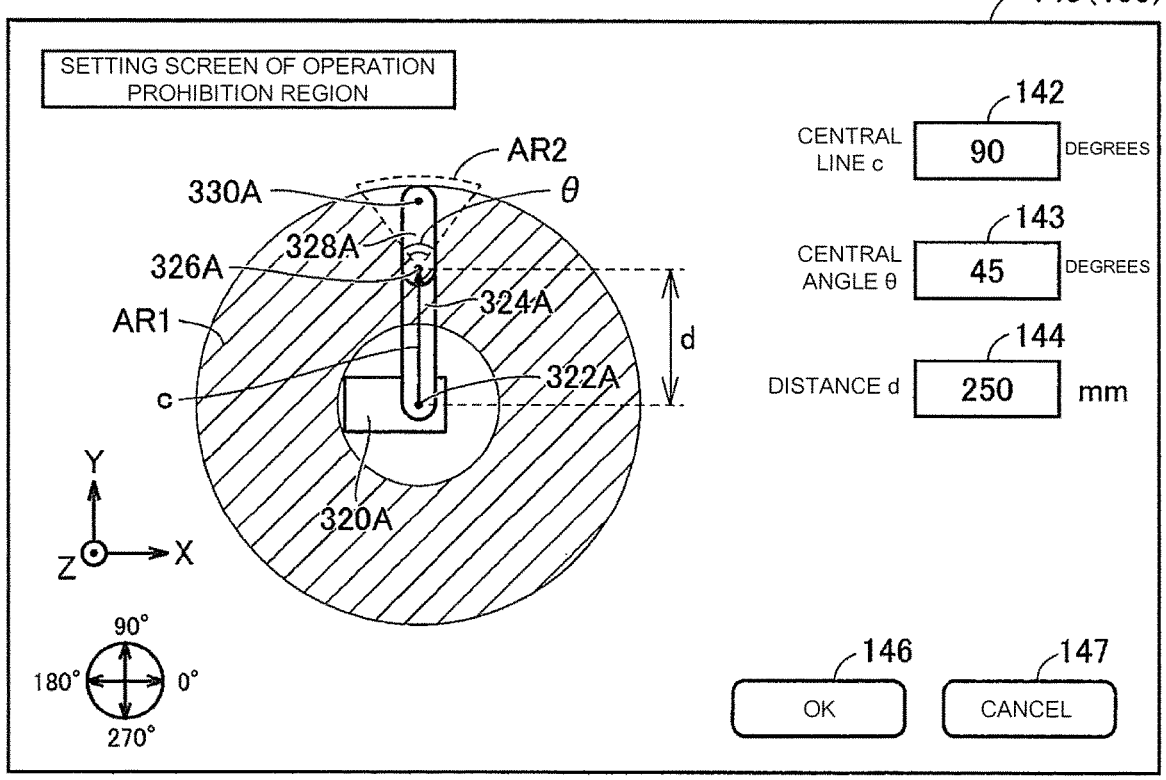
FIG. 5 is a diagram illustrating a user interface according to the first embodiment.

In the example of FIG. 5, a fan-shaped operation prohibition region AR2 is set. A size and a position of the fan-shaped operation prohibition region AR2 are set by any method. For example, the position and the size of the operation prohibition region AR2 are determined by a direction of a central line c of a fan shape on the XY plane, a central angle θ of the fan shape, and a distance d from the central point of the first rotation shaft 322 to the central point of the fan shape. The direction of the central line c is input in an input region 142. The central angle θ is input in an input region 143. The distance d is input in an input region 144. However, the operation prohibition region AR2 may be set by another method. For example, the operation prohibition region AR2 may be designated by a drag operation on the operation prohibition region AR2. In an exemplary embodiment, information within the input regions 142 to 144 changes in conjunction with the drag operation.

In step S24, the user is assumed to have pressed an OK button 146. Thereby, the setting device 100 stores the position and the size of the operation prohibition region AR2. That is, the setting device 100 stores the direction of the central line c, the central angle θ of the fan shape, and the distance d. Also, when a cancel button 147 is pressed, the setting device 100 closes the user interface 140 without storing the position and the size of the operation prohibition region AR2.

In step S30, the setting device 100 three-dimensionally extends the two-dimensional operation prohibition region AR2 set in the user interface 140. FIG. 6 is a conceptual diagram schematically illustrating a process of extending the operation prohibition region AR2.

Figure 6:
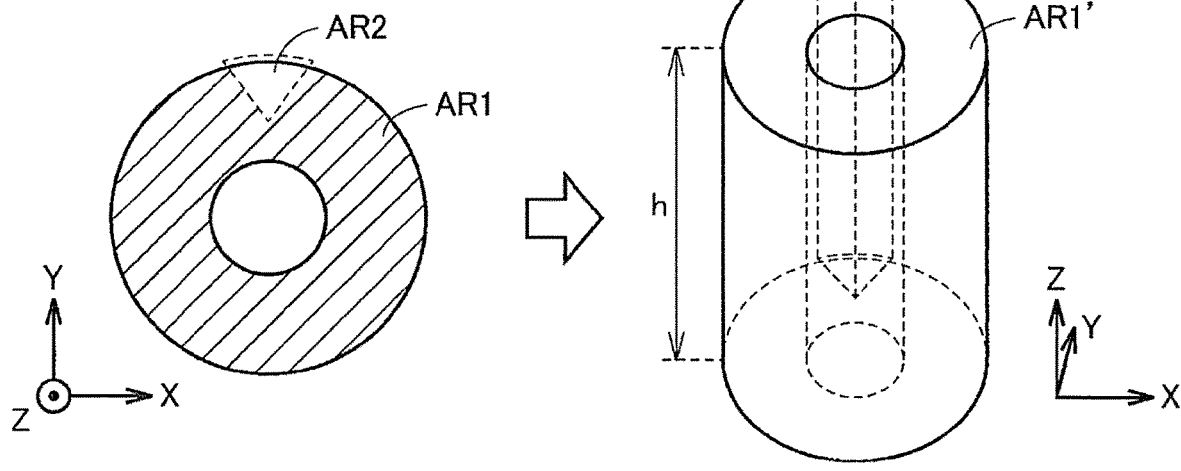
FIG. 6 is a conceptual diagram schematically illustrating a process of extending an operation prohibition region in the first embodiment.

As illustrated in FIG. 6, the setting device 100 extends the two-dimensional operation prohibition region AR2 to a three-dimensional operation prohibition region AR2' by extending the two-dimensional operation prohibition region AR2 in the Z direction. In other words, the setting device 100 extends the two-dimensional operation prohibition region AR2 to the three-dimensional operation prohibition region AR2' so that the shape of the operation prohibition region AR2' on any plane orthogonal to the Z direction becomes equal to that of the operation prohibition region AR2. In the example of FIG. 6, the shape of the operation prohibition region AR2' on any plane orthogonal to the Z direction becomes equal to that of the fan-shaped operation prohibition region AR2.

As described above, because the two-dimensional operation prohibition region AR2 is defined by the direction of the central line c, the central angle θ of the fan shape, and the distance d, the setting device 100 converts the direction of the central line c, the central angle θ of the fan shape, and the distance d into those in a coordinate system representing a real space in accordance with a predetermined conversion formula and adds a height h to a relevant index. Thereby, the operation prohibition region AR2 represented in the coordinate system on the user interface 140 is converted into the operation prohibition region AR2' represented in the coordinate system on the real space.

In an exemplary embodiment, the height h of the operation prohibition region AR2' is determined on the basis of a lower limit value and an upper limit value in the Z direction. The lower limit value and the upper limit value may be preset or arbitrarily set by the user. The lower limit value corresponds to a distance from a predetermined reference plane (for example, a ground surface) on the horizontal plane to a bottom surface of the operation prohibition region AR2'. The upper limit value corresponds to a distance from the reference plane to a top surface of the operation prohibition region AR2'. However, it is not necessary to set both the lower limit value and the upper limit value, and it is only necessary to set just one of the lower limit value and the upper limit value.

Also, typically, because an operable region AR1' of the SCARA robot 300 is invariable, the process of extending the operable region AR1 may be executed or may not be executed. If the process of extending the operable region AR1 is executed, the setting device 100 extends the two-dimensional operable region AR1 in the Z direction. Thereby, the two-dimensional operable region AR1 is extended to the three-dimensional operable region AR1'. In other words, the setting device 100 extends the two-dimensional operable region AR1 to the three-dimensional operable region AR1' so that the shape of the operable region AR1' on any plane orthogonal to the Z direction becomes equal to that of the operable region AR1.

Referring again to FIG. 4, in step S32, the setting device 100 transmits the set operation prohibition region AR2' to the controller 200.

The controller 200 stores the operation prohibition region AR2' received from the setting device 100. Thereby, the operation prohibition region AR2' is set in the controller 200.

(C2. Work Process)

Figure 7:
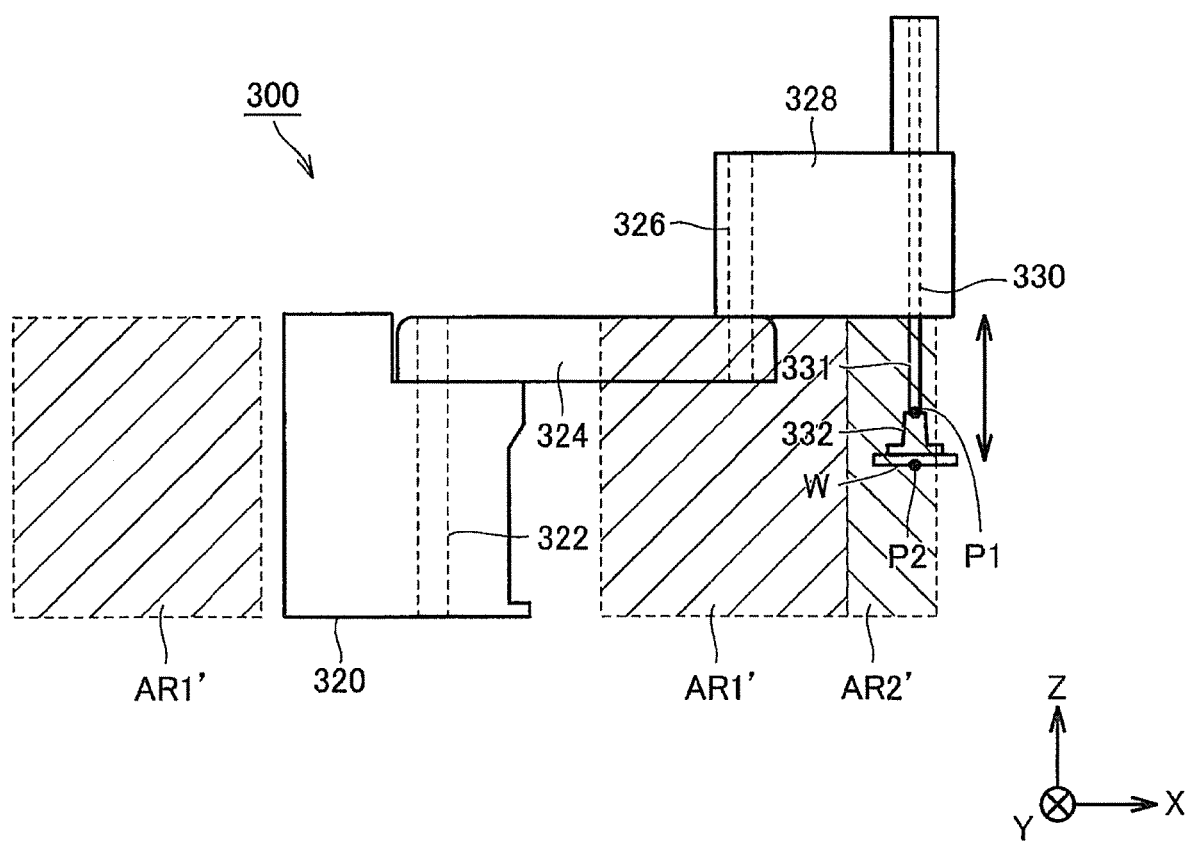
FIG. 7 is a diagram illustrating points of interest on the SCARA robot according to the first embodiment.

With continued reference to FIG. 4, a work process of the SCARA robot 300 will be described with reference to FIG. 7.

In step S40, the controller 200 is assumed to have received a work start operation for the SCARA robot 300.

In step S42, the controller 200 determines movement destinations of the first arm 324, the second arm 328, and the main shaft 331 in accordance with a preset work process and determines a movement destination of a predetermined point of interest on the SCARA robot 300. FIG. 7 is a diagram illustrating points of interest P1 and P2 on the SCARA robot 300. The point of interest P1 corresponds to a point on an attachment portion of the work tool 332 with respect to the main shaft 331. That is, the point of interest P1 corresponds to a point on a distal end of the main shaft 331 at the ground side. The point of interest P2 corresponds to a distal end portion of the work tool 332 on the ground side. The controller 200 determines movement destinations of the points of interest P1 and P2 according to a predetermined work process. Also, the points of interest P1 and P2 may be other points on the SCARA robot 300, and may be, for example, points on an end (a distal end) of the second arm 328 on a side different from a connection side between the first arm 324 and the second arm 328.

In step S44, the controller 200 calculates a trajectory from a present position to a movement destination with respect to each of the first arm 324, the second arm 328, and the main shaft 331, and calculates a trajectory from a present position to a movement destination with respect to each of the points of interest P1 and P2, on the basis of the movement destinations determined in step S42.

In step S46, the controller 200 determines whether or not the operation of the SCARA robot 300 is abnormal on the basis of the movement destinations of the points of interest P1 and P2 determined in step S42. More specifically, if the movement destinations of the points of interest P1 and P2 are included in the operable region AR1' and the movement destinations of the points of interest P1 and P2 are not included in the operation prohibition region AR2', the controller 200 determines that the operation of the SCARA robot 300 is normal. On the other hand, if the movement destination of either of the points of interest P1 and P2 deviates from the operable region AR1' or if the movement destination of either of the points of interest P1 and P2 is included in the operation prohibition region AR2', the controller 200 determines that the operation of the SCARA robot 300 is abnormal.

Also, the controller 200 may determine whether or not the operation of the SCARA robot 300 is abnormal on the basis of trajectories of the points of interest P1 and P2 determined in step S44. More specifically, if the trajectories of the points of interest P1 and P2 are all included in the operable region AR1' and the trajectories of the points of interest P1 and P2 do not overlap the operation prohibition region AR2', the controller 200 determines that the operation of the SCARA robot 300 is normal. On the other hand, if the trajectory of either of the points of interest P1 and P2 at least partially deviates from the operable region AR1' or if the trajectory of either of the points of interest P1 and P2 at least partially overlaps the operation prohibition region AR2', the controller 200 determines that the operation of the SCARA robot 300 is abnormal.

If it is determined that the operation of the SCARA robot 300 is abnormal, the controller 200 executes a predetermined process for coping with the abnormal operation. As an example, the controller 200 executes a process of stopping the SCARA robot 300.

In step S50, the controller 200 generates a command value for driving each of the first arm 324, the second arm 328, and the main shaft 331 to a target movement destination and transmits the command value to the servo driver 400. The servo driver 400 drives the SCARA robot 300 in accordance with the command value.

In step S52, the servo driver 400 transmits an actual position of each of the first arm 324, the second arm 328, and the main shaft 331 to the controller 200. The actual position is represented in, for example, a robot coordinate system.

In step S54, the controller 200 determines whether or not the operation of the SCARA robot 300 is abnormal on the basis of actual positions of the points of interest P1 and P2 on the SCARA robot 300. More specifically, when the actual positions of the points of interest P1 and P2 are included in the operable region AR1' and the actual positions of the points of interest P1 and P2 are not included in the operation prohibition region AR2', the controller 200 determines that the operation of the SCARA robot 300 is normal. On the other hand, if the actual position of either of the points of interest P1 and P2 deviates from the operable region AR1' or if the actual position of either of the points of interest P1 and P2 is included in the operation prohibition region AR2', the controller 200 determines that the operation of the SCARA robot 300 is abnormal. In this case, the controller 200 executes a predetermined process for coping with an abnormal operation. As an example, the controller 200 executes a process of stopping the SCARA robot 300.

The processing of steps S50, S52, and S54 is sequentially iterated until each configuration of the SCARA robot 300 reaches a target movement destination. Thereby, the controller 200 can determine in real time whether or not the operation of the SCARA robot 300 is abnormal in the work process of the SCARA robot 300.

Although the description has been given on the premise that a plurality of points of interest P1 and P2 are set in the above description, the number of points of interest may be one, three, or more. Also, the point of interest need not be a "point" in a strict sense and may be defined as a region having an area or a volume to a certain extent.

[D. Functional Configuration of Control System 1]

Figure 8:
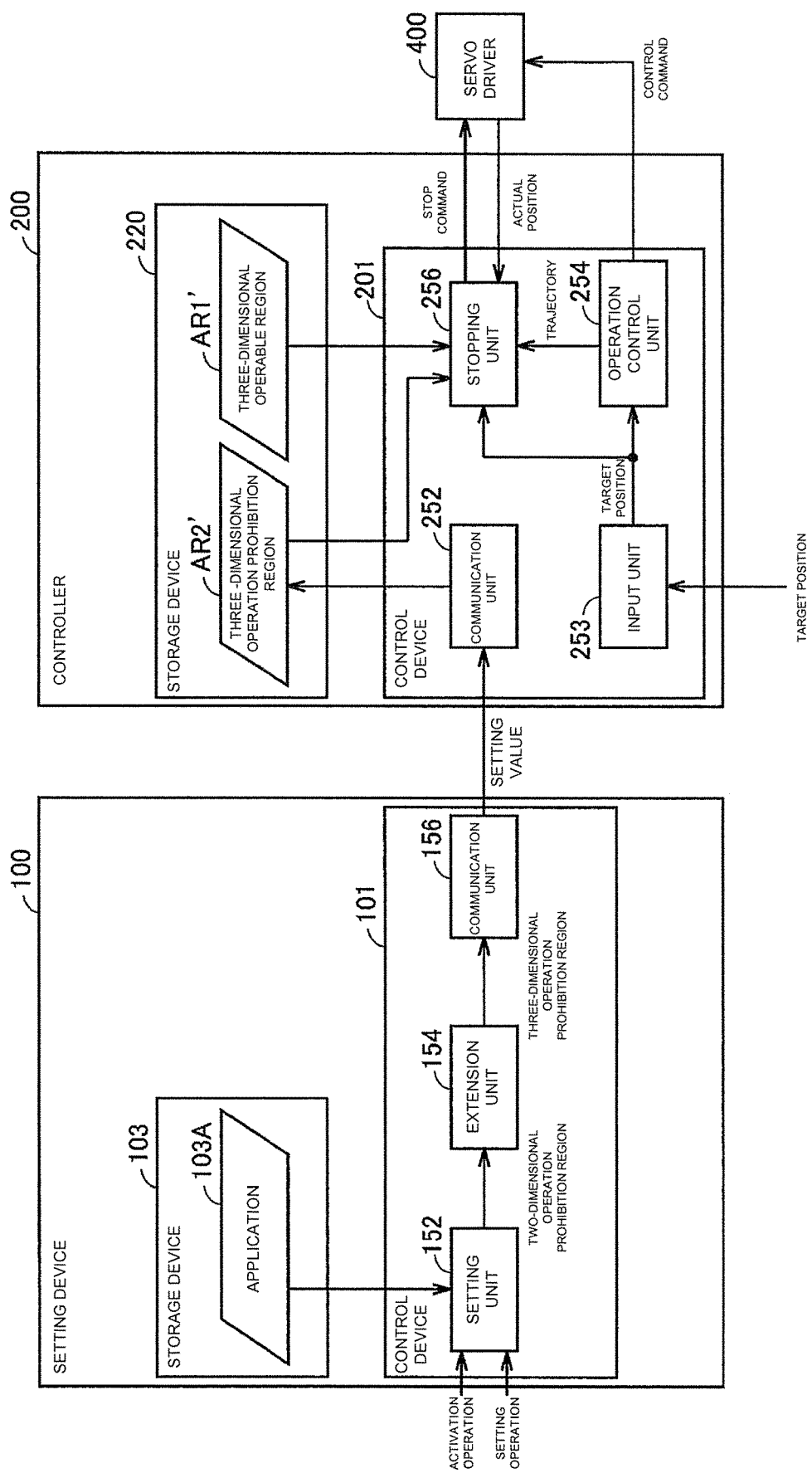
FIG. 8 is a diagram illustrating an example of functional configurations of a setting device and a controller according to the first embodiment.
Figure 9:
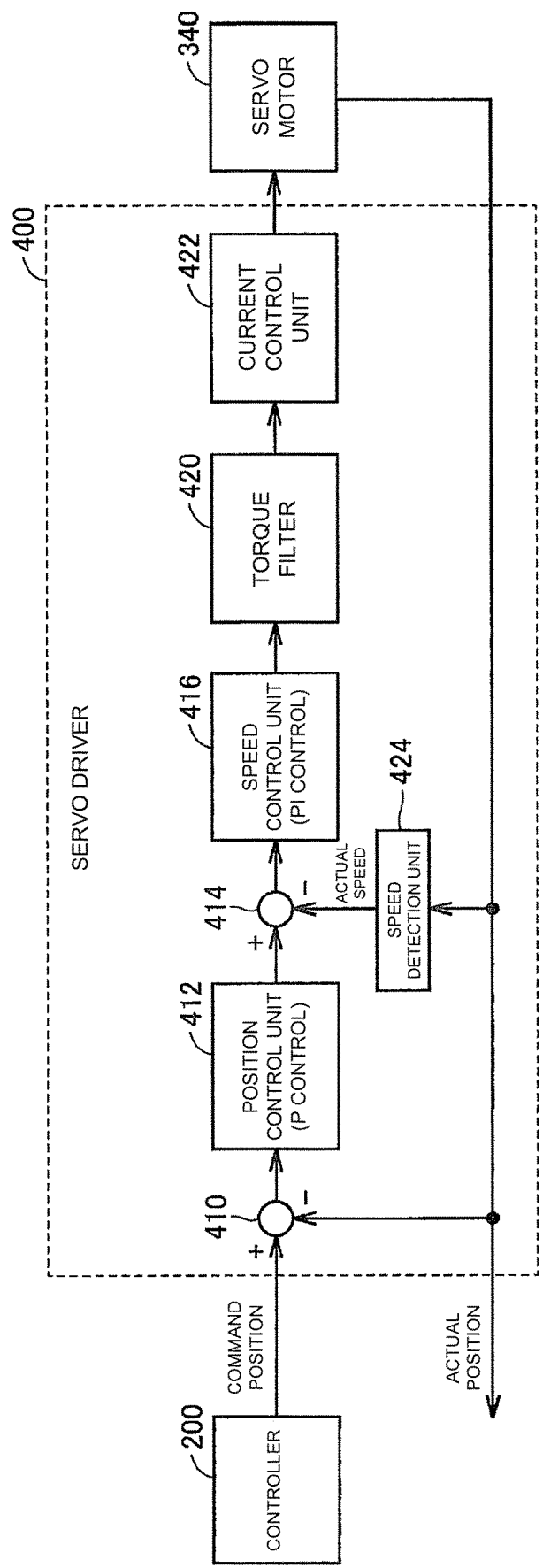
FIG. 9 is a diagram illustrating an example of a functional configuration of a servo driver according to the first embodiment.

The functions of the devices constituting the control system 1 will be described with reference to FIGS. 8 and 9. FIG. 8 is a diagram illustrating an example of functional configurations of the setting device 100 and the controller 200. FIG. 9 is a diagram illustrating an example of a functional configuration of the servo driver 400.

(D1. Functional Configuration of Setting Device 100)

First, a function of setting device 100 will be described with reference to FIG. 8.

As illustrated in FIG. 8, the setting device 100 includes a control device 101 and a storage device 103 as main hardware configurations. The control device 101 includes a setting unit 152, an extension unit 154, and a communication unit 156 as a functional configuration.

Figure 10:
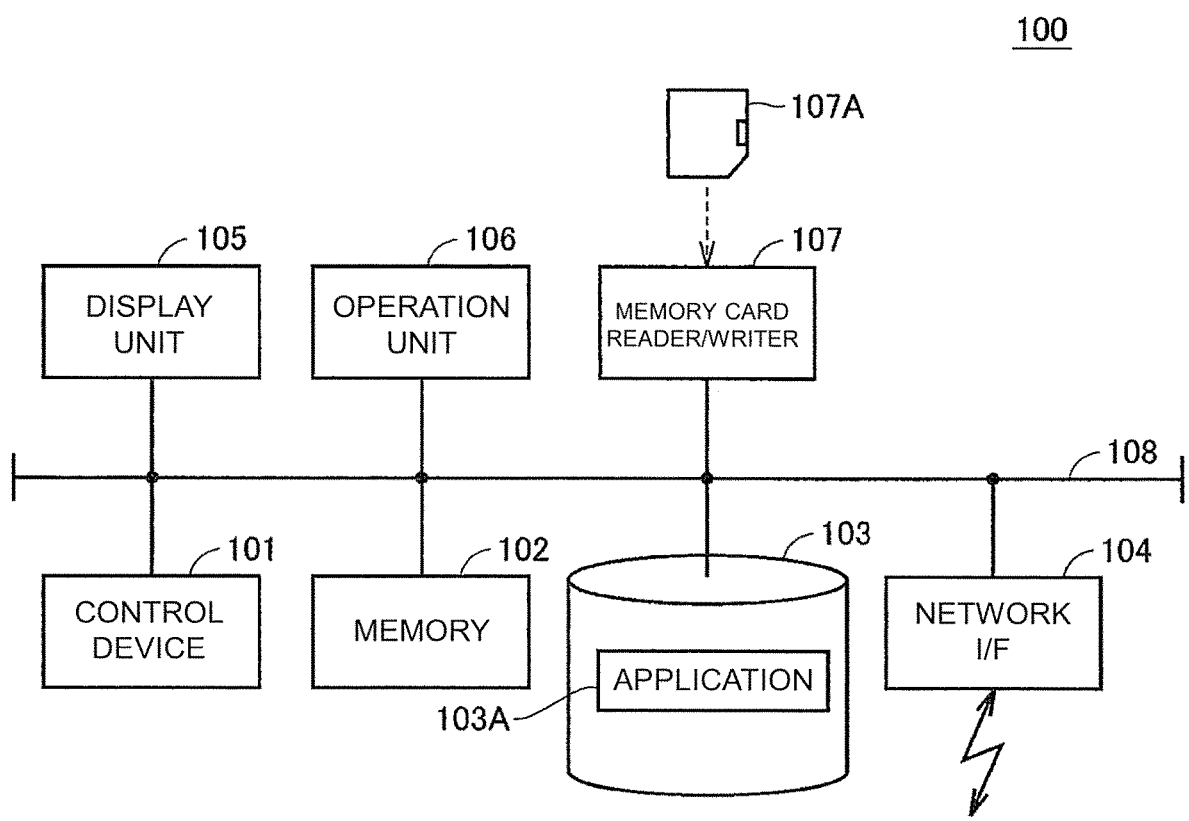
FIG. 10 is a block diagram illustrating a main hardware configuration of the setting device according to the first embodiment.

The setting unit 152 reads a setting program for implementing an operation setting of the SCARA robot 300 from the storage device 103 on the basis of reception of an operation of activating an application 103A, and displays the above-described user interface 140 on the display unit 105 of the setting device 100 (see FIG. 10). The user interface 140 receives a setting of a two-dimensional operation prohibition region with respect to a predetermined point of interest on the SCARA robot 300. The setting unit 152 outputs the two-dimensional operation prohibition region set for the user interface 140 to the extension unit 154.

The extension unit 154 extends the two-dimensional operation prohibition region to the three-dimensional operation prohibition region by extending the two-dimensional operation prohibition region in the Z direction. That is, the shape of the three-dimensional operation prohibition region on the XY plane becomes equal to the shape of the two-dimensional operation prohibition region. Because the method of extending the operation prohibition region is the same as described in FIG. 6, description thereof will not be repeated.

The communication unit 156 transmits the three-dimensional operation prohibition region output from the extension unit 154 to the controller 200 of a designated transmission destination via the network interface (I/F) 104 (see FIG. 10) of the setting device 100.

Also, the setting unit 152, the extension unit 154, and the communication unit 156 are not necessarily mounted in the setting device 100, and may be mounted in other devices. As an example, at least a part of the functional configuration of the setting device 100 may be mounted in the controller 200. Alternatively, a part of the functional configuration of the setting device 100 may be mounted in an external device such as a server. In this case, the setting device 100 is configured in a form like a so-called cloud service in which a server executes a part of a process of a control program according to the present embodiment.

(D2. Functional Configuration of Controller 200)

Next, a function of the controller 200 will be described with reference to FIG. 8.

As illustrated in FIG. 8, the controller 200 includes a control device 201 and a storage device 220 as a main hardware configuration. The control device 201 includes a communication unit 252, an input unit 253, an operation control unit 254, and a stopping unit 256 as a functional configuration.

The communication unit 252 controls fieldbus controllers 208 and 209 (see FIG. 11) to be described below. The communication unit 252 receives the operation prohibition region AR2' from the setting device 100 via the fieldbus controller 208 and stores the operation prohibition region AR2' in the storage device 220. The operation prohibition region AR2' is represented in a coordinate system on a real space.

The input unit 253 acquires a movement destination (a target position) of the SCARA robot 300 from the setting device 100 or a host controller. The target position is determined, for example, by the setting device 100 or the host controller in accordance with a predetermined work process. The target position is output to the operation control unit 254 and the stopping unit 256.

The operation control unit 254 generates a trajectory of each arm of the SCARA robot 300 in accordance with the target position received from the input unit 253, and generates a control command for each arm on the basis of the trajectory. The generated trajectory is output to the stopping unit 256. The generated control command is output to the servo driver 400. The servo driver 400 drives the SCARA robot 300 on the basis of the control command received from the operation control unit 254.

The stopping unit 256 monitors a position of a point of interest on the SCARA robot 300 and stops the servo driver 400 for driving the SCARA robot 300 if the SCARA robot 300 performs an abnormal operation. More specifically, the stopping unit 256 stops the driving of the SCARA robot 300 when a predetermined point of interest on the SCARA robot 300 is included in the operation prohibition region AR2'. Thereby, the stopping unit 256 can stop the SCARA robot 300 if the SCARA robot 300 performs an unintended operation. Whether or not the abnormal operation of the SCARA robot 300 is being performed may be determined on the basis of the target position of the point of interest on the SCARA robot 300 or may be determined on the basis of the actual position of the point of interest.

In an exemplary embodiment, the stopping unit 256 determines whether or not the SCARA robot 300 is performing an abnormal operation on the basis of the operable region AR1' as well as the operation prohibition region AR2'. More specifically, the stopping unit 256 stops the driving of the SCARA robot 300 if the point of interest is not included in the operable region AR1' as well as if the predetermined point of interest on the SCARA robot 300 is included in the operation prohibition region AR2'. By using both the operable region AR1' and the operation prohibition region AR2' as a criterion for determining an abnormal operation of the SCARA robot 300, safety is further enhanced.

Also, the communication unit 252, the input unit 253, the operation control unit 254, and the stopping unit 256 are not necessarily mounted in the controller 200, and may be mounted in other devices. As an example, at least a part of the functional configuration of the controller 200 may be implemented in another device (for example, the SCARA robot 300). Alternatively, at least a part of the functional configuration of the controller 200 may be mounted in an external device such as a server. In this case, the controller 200 is configured in a form like a so-called cloud service in which a server executes a part of the process of the control program according to the present embodiment.

(D3. Functional Configuration of Servo Driver 400)

Next, an example of the functional configuration of the servo driver 400 connected to the controller 200 according to the present embodiment will be described with reference to FIG. 9. Each functional block illustrated in FIG. 9 is implemented by a control device (not illustrated) of the servo driver 400.

In the control system 1 according to the present embodiment, a target position is given as a command value from the controller 200 to the servo driver 400. The servo driver 400 controls a driving electrical current to be supplied to the servo motor 340 so that the actual position of each arm of the SCARA robot 300 to be controlled matches the target position from the controller 200.

Typically, in the servo driver 400, a control loop including a minor loop for a speed is implemented in addition to a main loop for a position. More specifically, the servo driver 400 includes difference calculation units 410 and 414, a position control unit 412, a speed control unit 416, a torque filter 420, a current control unit 422, and a speed detection unit 424 as a functional configuration.

The position control unit 412 is a control calculation unit constituting the control loop for the position and outputs an amount of control according to a deviation between a target position and an actual position (a feedback value) calculated in the difference calculation unit 410. Typically, proportional (P) control may be used in the position control unit 412. That is, the position control unit 412 outputs a value obtained by multiplying the deviation between the target position and the actual position by a predetermined proportional coefficient as the amount of control.

The speed control unit 416 is a control calculation unit constituting the control loop for the speed and outputs an amount of control according to a deviation between an amount of control from the position control unit 412 and an actual speed from the speed detection unit 424 calculated in the difference calculation unit 414. Typically, proportional integral (PI) control may be used for the speed control unit 416. That is, the speed control unit 416 outputs a sum of a value obtained by multiplying a deviation between a command speed and an actual speed from the difference calculation unit 414 by a proportional coefficient and a value obtained by performing integration according to an integral element as an amount of control.

The torque filter 420 reduces a degree of change with time so that a degree of change per unit time of an amount of control (a command value of a torque to be generated by the servo motor 340) output from the speed control unit 416 is not excessively large. That is, the torque filter 420 causes an amount of control output from the speed control unit 416 to be reduced. The amount of control from the torque filter 420 is output to the current control unit 422.

The current control unit 422 determines a switching timing in the servo motor 340 of the SCARA robot 300 in correspondence with the amount of control from the torque filter 420. That is, the current control unit 422 determines a magnitude, a timing, a waveform, or the like of an electrical current to be supplied to the servo motor 340 so that a command torque determined by the torque filter 420 can be implemented. The servo motor 340 is driven in accordance with the amount of control determined by the current control unit 422. The servo motor 340 is rotationally driven by an electrical current supplied from the servo motor 340.

An actual position is output from an encoder (not illustrated) as a feedback value indicating displacement of each arm of the SCARA robot 300. The speed detection unit 424 calculates an actual speed by differentiating the actual position from the encoder.

[E. Hardware Configuration of Control System 1]

Hardware configurations of the setting device 100 and the controller 200 constituting the control system 1 will be described with reference to FIGS. 10 and 11.

(E1. Hardware Configuration of Setting Device 100)

First, a hardware configuration of the setting device 100 will be described with reference to FIG. 10. FIG. 10 is a block diagram illustrating a main hardware configuration of the setting device 100.

The setting device 100 is implemented by, for example, a general-purpose computer. A computer configured to implement the setting device 100 includes a control device 101, a memory 102, a storage device 103 such as a hard disk drive (HDD), a network interface (I/F) 104, a display unit 105, an operation unit 106, and a memory card reader/writer 107. These parts are communicably connected to each other via an internal bus 108.

The control device 101 implements the above-described various functions by loading a program (command codes) stored in the storage device 103 or the like to the memory 102 and executing the loaded program (command codes). The memory 102 and the storage device 103 store data in volatile and nonvolatile modes, respectively. The storage device 103 stores the application 103A in addition to an operating system (OS). The application 103A is a basic program that provides the above-described user interface 140 (see FIG. 5).

The network interface 104 exchanges data between the setting device 100 and the controller 200 via the field network NW1 (see FIG. 1).

The display unit 105 displays the above-described user interface 140 and the like on the basis of reception of an activation instruction of the application 103A. The display unit 105 includes a display such as a liquid crystal display (LCD).

The operation unit 106 receives a user operation and outputs an internal command indicating the received operation to the control device 101 or the like. The operation unit 106 typically includes a keyboard, a mouse, a touch panel, a tablet, a voice recognition device, and the like.

The memory card reader/writer 107 reads data from a memory card 107A and writes data to the memory card 107A. As the memory card 107A, a known recording medium such as a secure digital (SD) card can be adopted.

(E2. Hardware Configuration of Controller 200)

Next, a hardware configuration of the controller 200 will be described with reference to FIG. 11. FIG. 11 is a block diagram illustrating an example of the hardware configuration of the controller 200.

The controller 200 includes a control device 201 such as a central processing unit (CPU) or a micro-processing unit (MPU), a chip set 202, a main memory 206, a storage device 220, a local network controller 203, a universal serial bus (USB) controller 204, a memory card interface 205, an internal bus controller 210, fieldbus controllers 208 and 209, and I/O units 211-1, 211-2, . . . .

The control device 201 reads various types of programs stored in the storage device 220, loads the programs to the main memory 206, and executes the loaded programs, thereby implementing control according to a control object and a process according to the present embodiment. The chip set 202 implements a process of the entire controller 200 by controlling the control device 201 and each component.

The storage device 220 is, for example, a secondary storage device. In the storage device 220, a user program 221 to be executed using a PLC engine and the like are stored in addition to a system program for implementing the PLC engine. The user program 221 includes a sequence program 222 mainly for logical calculation, a motion program 223 mainly including numerical calculation such as position control and speed control, a setting program 224 of the SCARA robot 300, and the like.

The local network controller 203 controls the exchange of data with other devices (for example, a server and the like) via a local network. The USB controller 204 controls the exchange of data with other devices (for example, a personal computer (PC) and the like) via a USB connection.

The memory card interface 205 is configured so that the memory card 216 can be attached and detached, and it is possible to write data to the memory card 216 and to read various types of data (a user program, trace data, and the like) from the memory card 216.

The internal bus controller 210 is an interface for exchanging data with the I/O units 211-1, 211-2, . . . mounted in the controller 200.

The fieldbus controller 208 controls the exchange of data with other devices (for example, the setting device 100 and the like) via the field network NW1 (see FIG. 1). Likewise, the fieldbus controller 209 controls the exchange of data with other devices (for example, the SCARA robot 300 and the servo driver 400) via the field network NW2 (see FIG. 1).

Figure 11:
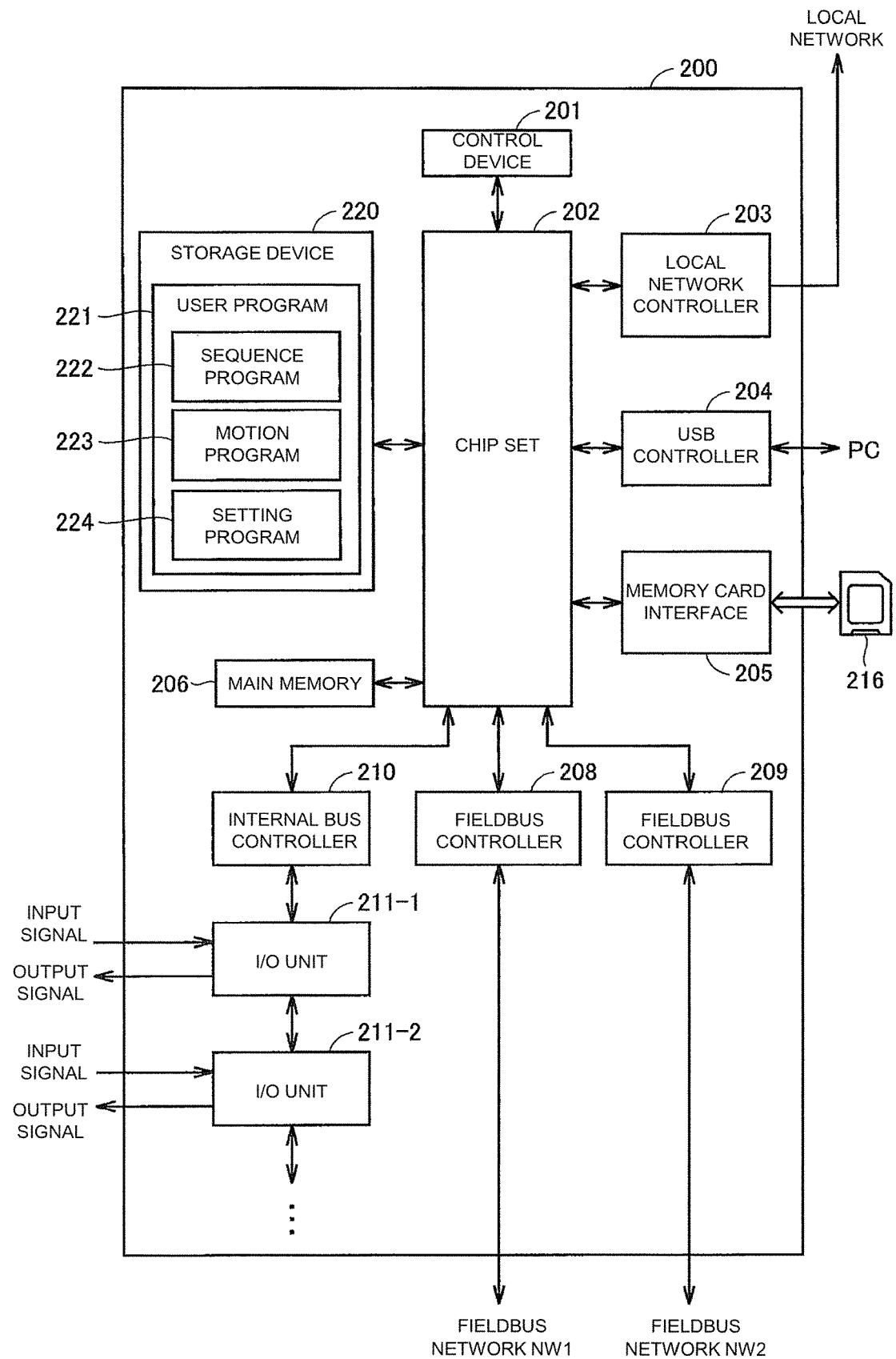
FIG. 11 is a block diagram illustrating an example of a hardware configuration of the controller according to the first embodiment.

Although an example of a configuration in which necessary functions are provided by the control device 201 executing a program is illustrated in FIG. 11, some or all of these provided functions may be implemented by a dedicated hardware circuit (for example, an application specific integrated circuit (ASIC), a field-programmable gate array (FPGA), or the like). Alternatively, the main part of the controller 200 may be implemented using hardware according to a general-purpose architecture (for example, an industrial personal computer based on a general-purpose personal computer). In this case, by using virtualization technology, a plurality of operating systems (OSs) with different applications may be executed in parallel and a necessary application may be executed on each OS.

[F. Control Structure of Control System 1]

As described above, a process executed by the control system 1 mainly includes a setting process and a work process. Hereinafter, a flow of a setting process of the setting device 100 and a flow of a work process of the SCARA robot 300 will be described in order with reference to FIGS. 12 to 15.

(F1. Flow of Setting Process)

Figure 12:
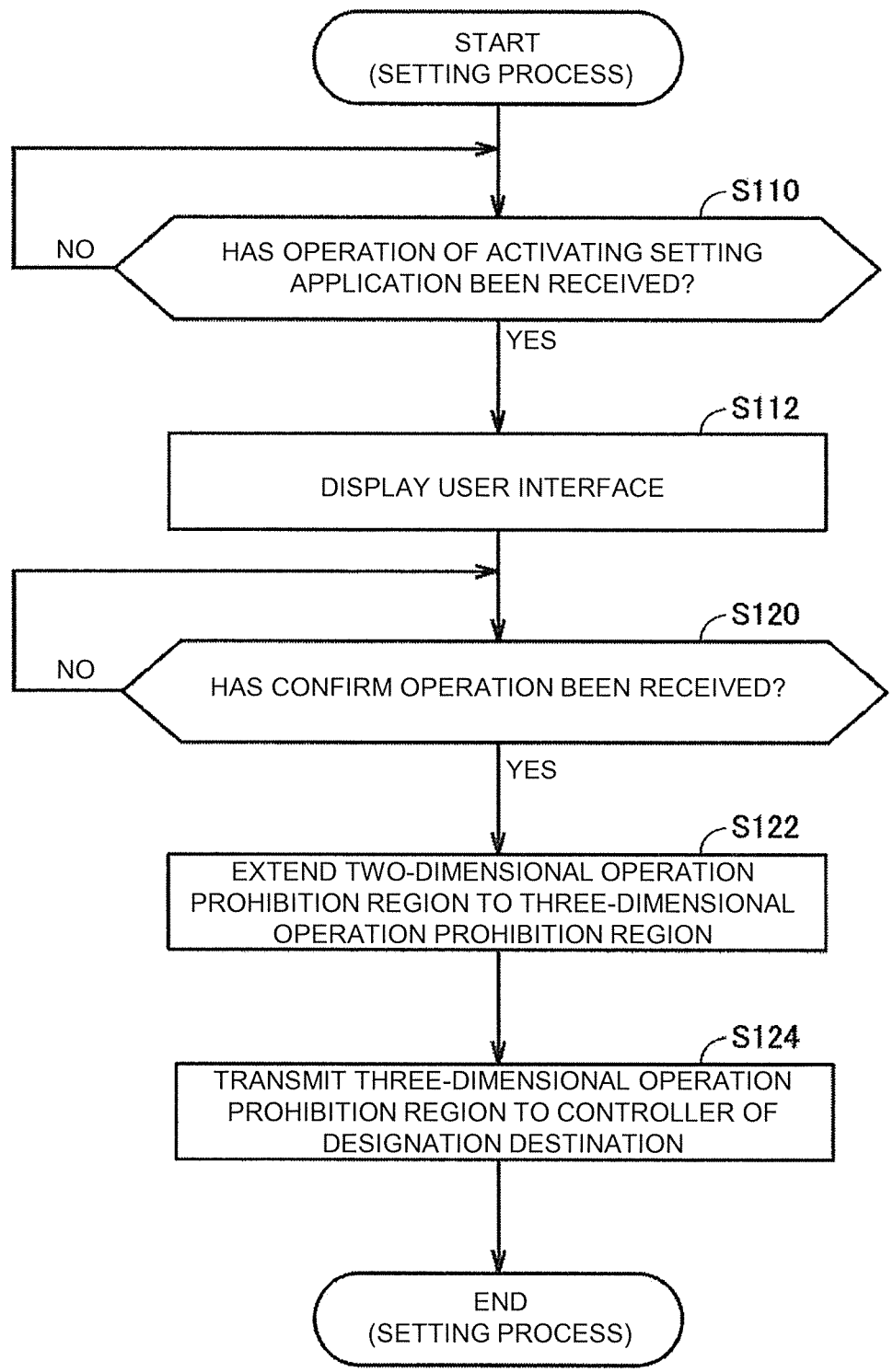
FIG. 12 is a flowchart illustrating a setting process of the setting device according to the first embodiment.

First, a flow of a setting process of the setting device 100 will be described with reference to FIG. 12. FIG. 12 is a flowchart illustrating a setting process of the setting device 100. The process of FIG. 12 is implemented by the control device 101 (see FIG. 8) of the setting device 100 executing a program. In another aspect, a part or all of the process may be performed by an FPGA, a circuit element, or other hardware.

In step S110, the control device 101 determines whether or not an operation of activating an application for setting an operation of the SCARA robot 300 has been received. For example, the activation operation is received by the operation unit 106 (see FIG. 10). If it is determined that the operation of activating the application for setting the operation of the SCARA robot 300 has been received (YES in step S110), the control device 101 switches control to step S112. Otherwise (NO in step S110), the control device 101 re-executes the processing of step S110.

In step S112, the control device 101 displays the user interface 140 (see FIG. 5) on the display unit 105 (see FIG. 10) of the setting device 100 as the above-described setting unit 152 (see FIG. 8). In the user interface 140, an image representing the SCARA robot 300 is displayed from the Z direction, and the user can set an operation prohibition region AR2 of the SCARA robot 300 with respect to the image. As an example, the user sets a direction of a central line c of a fan shape on an XY plane, a central angle θ of the fan shape, and a distance d from a central point of the first rotation shaft 322, thereby setting the fan-shaped operation prohibition region AR2.

In step S120, the control device 101 determines whether or not an operation of confirming a setting of the operation prohibition region AR2 has been received. As an example, the user can confirm the setting of the operation prohibition region AR2 by pressing the OK button 146 on the user interface 140. If it is determined that the operation of confirming the setting of the operation prohibition region AR2 has been received (YES in step S120), the control device 101 switches the control to step S122. Otherwise (NO in step S120), the control device 101 re-executes the process of step S120.

In step S122, the control device 101 extends the set two-dimensional operation prohibition region AR2 to the three-dimensional operation prohibition region AR2' as the above-described extension unit 154 (see FIG. 8). At this time, the control device 101 converts the operation prohibition region AR2 shown in a coordinate system on the user interface 140 into that in a coordinate system on a real space.

Figure 13:
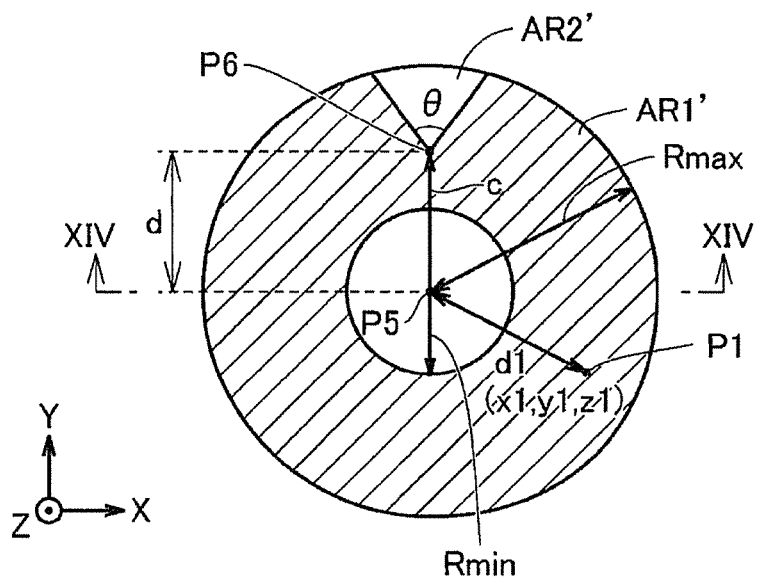
FIG. 13 illustrates a plan view of an operation prohibition region on a real space.
Figure 14:
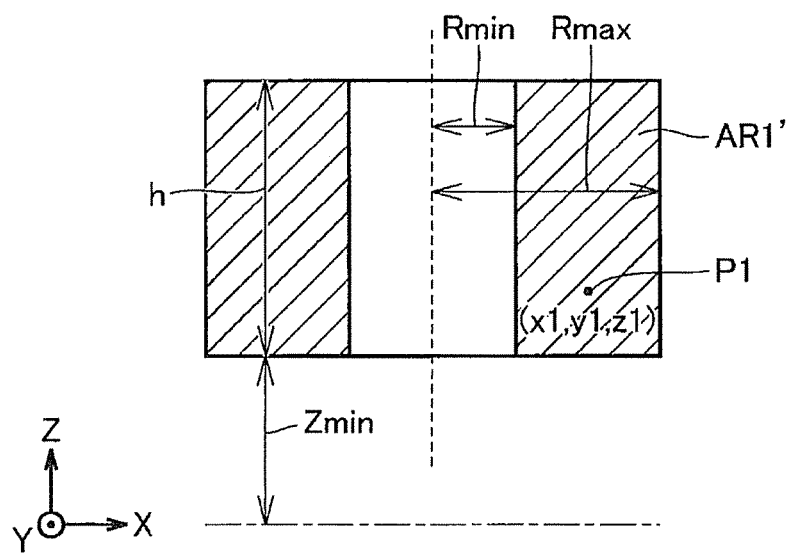
FIG. 14 is a cross-sectional view of the operation prohibition region taken along the line XIV-XIV of FIG. 13.

FIG. 13 illustrates a plan view of the operation prohibition region AR2' on the real space. FIG. 14 illustrates a cross-sectional view of the operation prohibition region AR2' taken along the line XIV-XIV of FIG. 13.

As illustrated in FIGS. 13 and 14, the operation prohibition region AR2' in the real space is defined by a distance d from a central point P5 of the first rotation shaft 322 to a central point P6 of the fan shape, a central angle θ of the fan shape, a direction (an angle) of the central line c of the fan shape, a lower limit value Zmin to a lower limit from a predetermined reference plane (for example, a ground surface) on a horizontal plane, and a height h in a Z direction. Typically, the distance d, the central angle θ, and the direction of the central line c are set in the user interface 140. The lower limit value Zmin and the height h may be preset or may be set on the user interface 140.

In step S124, the control device 101 transmits the operation prohibition region AR2' to the designated controller 200 as the above-described communication unit 156 (see FIG. 8). At this time, an operable region AR1' may be further transmitted to the designated controller 200.

(F2. Flow of Work Process)

Figure 15:
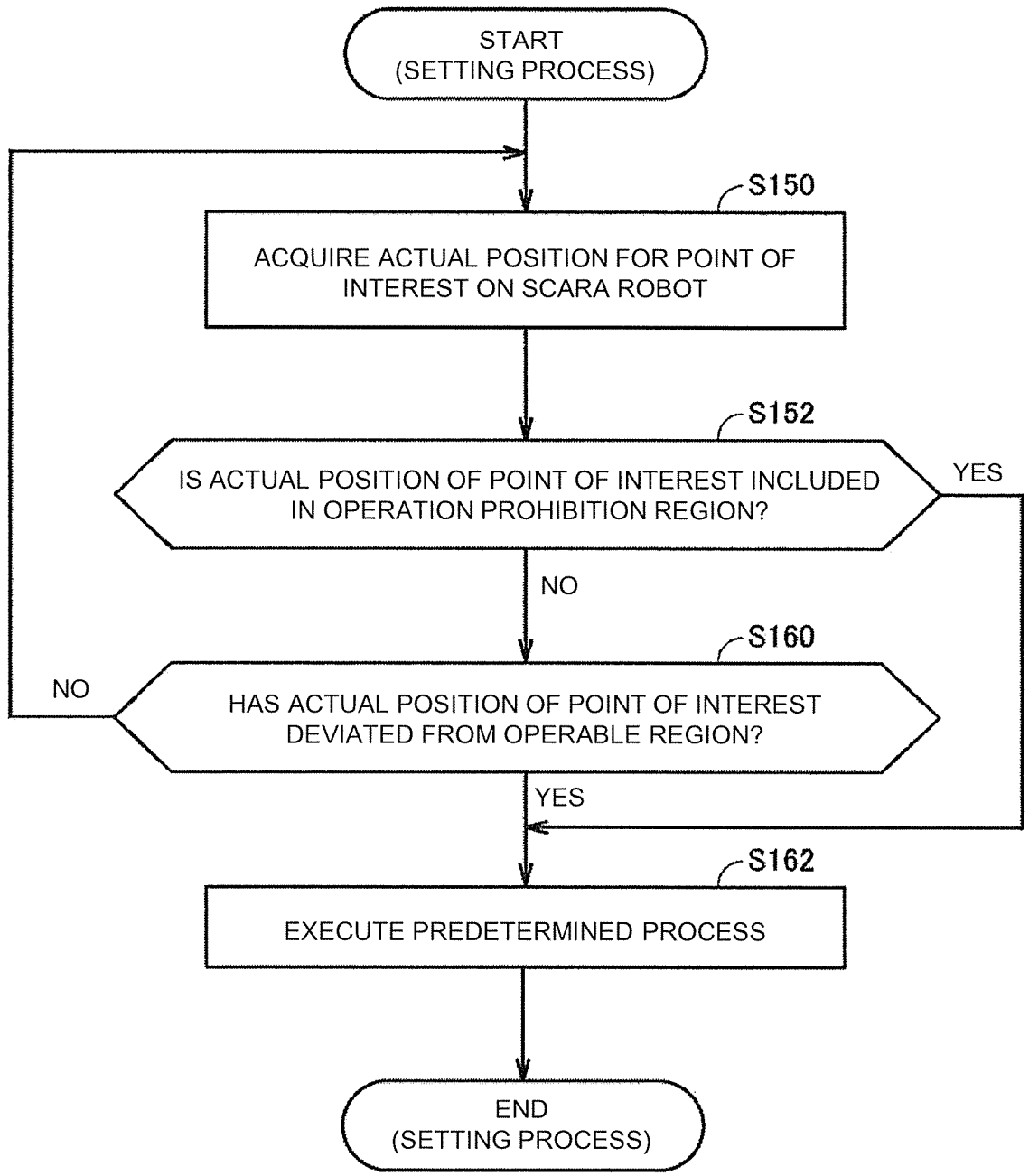
FIG. 15 is a flowchart illustrating a work process of the SCARA robot controlled by the controller according to the first embodiment.

Next, a flow of a work process of the SCARA robot 300 controlled by the controller 200 will be described with reference to FIG. 15. FIG. 15 is a flowchart illustrating the work process of the SCARA robot 300 controlled by the controller 200. The process of FIG. 15 is implemented by the control device 201 (see FIG. 8) of the controller 200 executing a program. In other aspects, a part or all of the process may be performed by an FPGA, a circuit element, or other hardware.

In step S150, the control device 201 acquires an actual position at the point of interest P1 (see FIGS. 13 and 14) on the SCARA robot 300 from the servo driver 400. The actual position is represented by coordinate values on the real space. Typically, the actual position is represented by coordinate values (x1,y1,z1). The coordinate value x1 corresponds to a coordinate in the X direction. The coordinate value y1 corresponds to a coordinate in the Y direction. The coordinate value z1 corresponds to a coordinate in the Z direction.

In step S152, the control device 201 determines whether or not the point of interest P1 is included in the operation prohibition region AR2'. More specifically, the control device 201 determines that the point of interest P1 is included in the operation prohibition region AR2' if the coordinate values x1 and y1 of the point of interest P1 are included in the fan shape region defined by the distance d, the direction of the central line c, and the central angle θ and the following Expression (1) is satisfied.

$$Z\min < z1 < Z\min + h \tag{1}$$

If it is determined that the point of interest P1 is included in the operation prohibition region AR2'(YES in step S152), the control device 201 switches the control to step S162. Otherwise (NO in step S152), the control device 201 switches control to step S160.

In step S160, the control device 201 determines whether or not the point of interest P1 is included in the operable region AR1'. More specifically, if any one of the following Expressions (2) to (5) is satisfied, the control device 201 determines that the point of interest P1 is not included in the operable region AR1'. The distance d1 shown in Expressions (2) and (3) corresponds to the distance from the central point P5 on the XY plane to the point of interest P1.

$$d1 < R\ min \quad (2)$$

$$R\ max < d1 \quad (3)$$

$$z1 < Z\ min \quad (4)$$

$$Z\ min + h < z1 \quad (5)$$

When the control device 201 determines that the point of interest P1 has deviated from the operable region AR1' (YES in step S160), the control device 201 switches control to step S162. Otherwise (NO in step S160), the control device 201 switches control to step S150.

In step S162, the control device 201 executes a predetermined process for coping with an abnormal operation as the above-described stopping unit 256 (see FIG. 8). As an example, the control device 201 executes a process of stopping the SCARA robot 300. Alternatively, the control device 201 executes a processing of providing a notification of the abnormal operation. The notification of the abnormal operation may be provided by a sound such as a warning sound or a voice sound or the notification of the abnormal operation may be provided by displaying an error screen or the like.

Also, although the flow for determining an operation abnormality of the SCARA robot 300 on the basis of the actual position of the point of interest P1 on the SCARA robot 300 has been described above, an operation abnormality may be determined on the basis of a movement destination of the point of interest P1. Alternatively, an operation abnormality may be determined on the basis of a trajectory from a present position of the point of interest P1 to the movement destination thereof.

[G. Summary of First Embodiment]

As described above, the setting device 100 according to the present embodiment provides the user interface 140 for setting the operation prohibition region of the SCARA robot 300. The user interface 140 can display an image representing the SCARA robot 300 from the Z direction and the user can two-dimensionally set the operation prohibition region AR2 with respect to the image. The setting device 100 extends the set two-dimensional operation prohibition region AR2 in the Z direction and extends the two-dimensional operation prohibition region AR2 to the three-dimensional operation prohibition region AR2'. Thereafter, the setting device 100 sets the three-dimensional operation prohibition region AR2' in the controller 200. In this manner, the user can two-dimensionally set the operation prohibition region AR2 and the operation of setting the operation prohibition region is simplified.

Thereafter, the SCARA robot 300 performs predetermined work on a workpiece. At this time, the controller 200 monitors whether or not a predetermined point of interest on the SCARA robot 300 has entered the operation prohibition region AR2'. If the point of interest has entered the operation prohibition region AR2', the controller 200 determines that the operation of the SCARA robot 300 is abnormal.

Because the three-dimensional operation prohibition region AR2' is an extension of the two-dimensional operation prohibition region AR2 in the Z direction as described above, the three-dimensional operation prohibition region AR2' has a simple shape. Thus, the controller 200 can immediately determine whether or not the point of interest on the SCARA robot 300 is included in the three-dimensional operation prohibition region AR2'. Thereby, a calculation time is significantly shortened.

Second Embodiment

[A. Overview]

The user interface 140 according to the first embodiment is configured to receive a setting of the fan-shaped operation prohibition region AR2. On the other hand, the user interface 140 according to the second embodiment is configured to receive a setting of a polygonal operation prohibition region AR2.

Because other points such as hardware configurations of the control system 1 according to the second embodiment are the same as those of the control system 1 according to the first embodiment, description thereof will not be repeated below.

[B. User Interface 140]

Figure 16:
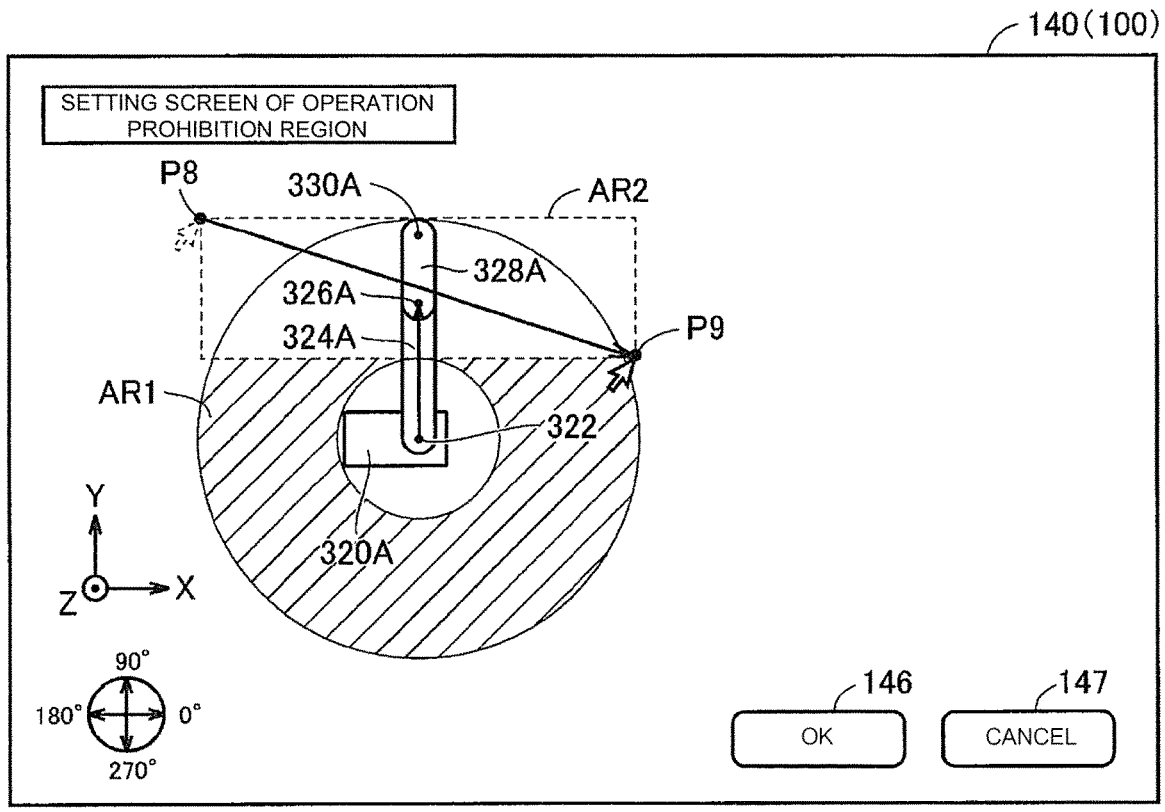
FIG. 16 is a diagram illustrating a user interface according to a second embodiment.

The user interface 140 according to the second embodiment will be described with reference to FIG. 16. FIG. 16 is a diagram illustrating the user interface 140 according to the second embodiment.

In the present embodiment, the user can set a polygonal operation prohibition region AR2 on the user interface 140. Although a rectangular operation prohibition region AR2 is set in the example of FIG. 16, the shape of the operation prohibition region AR2 capable of being set may be a square shape or a hexagonal shape. Alternatively, the shape of the operation prohibition region AR2 capable of being set may be a circle or an ellipse. A size and a position of the operation prohibition region AR2 are set by any method. For example, the position and the size of the operation prohibition region AR2 may be set by a drag operation on the operation prohibition region AR2. In the example of FIG. 16, the user presses the operation unit 106 at a position P8 and moves the operation unit 106 to a position P9 while maintaining the pressed state, thereby setting the operation prohibition region AR2.

On the basis of the pressing of the OK button 146 by the user, the setting device 100 stores the position and the size of the operation prohibition region AR2. As an example, the setting device 100 stores coordinate values of the position P8 and coordinate values of the position P9. Alternatively, the setting device 100 may store either one of the coordinate values of the position P8 and the coordinate values of the position P9, and a lateral width and a longitudinal width of the operation prohibition region AR2.

When the cancel button 147 is pressed, the setting device 100 closes the user interface 140 without storing the position and the size of the two-dimensional operation prohibition region AR2.

[C. Process of Extending Operation Prohibition Region]

Figure 17:
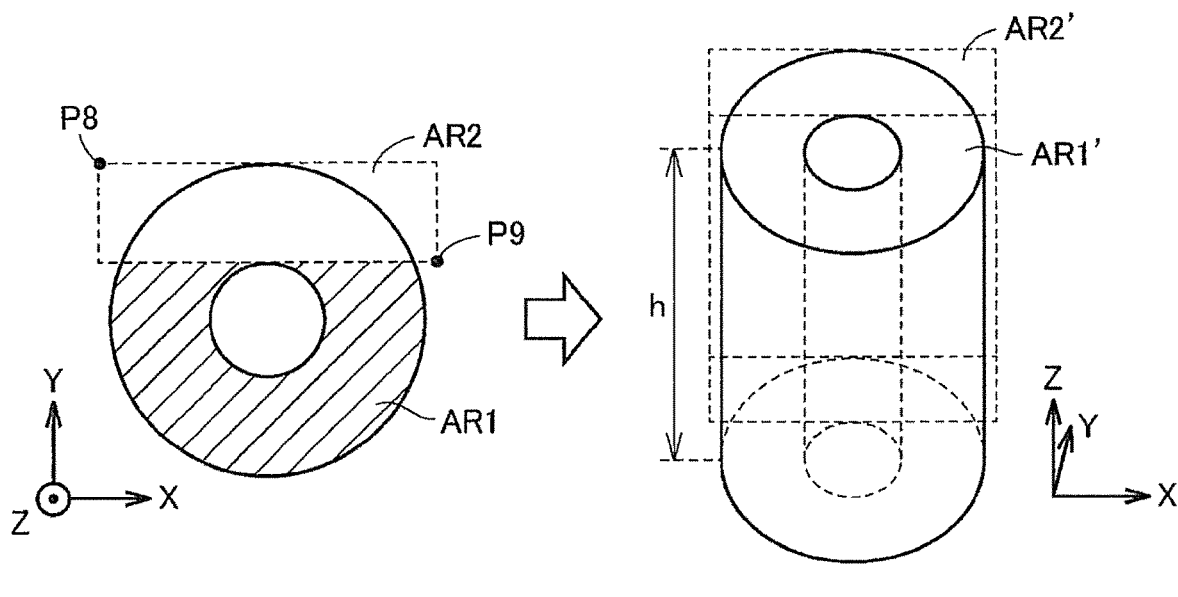
FIG. 17 is a conceptual diagram schematically illustrating a process of extending an operation prohibition region in the second embodiment.

A process of extending the two-dimensional operation prohibition region AR2 to the three-dimensional operation prohibition region AR2' will be described with reference to FIG. 17. FIG. 17 is a conceptual diagram schematically illustrating a process of extending an operation prohibition region AR2 in the second embodiment.

As illustrated in FIG. 17, the setting device 100 extends the two-dimensional operation prohibition region AR2 to the three-dimensional operation prohibition region AR2' by extending the two-dimensional operation prohibition region AR2 in the Z direction. In other words, the setting device 100 extends the two-dimensional operation prohibition region AR2 to the three-dimensional operation prohibition region AR2' so that the shape of the three-dimensional operation prohibition region AR2' on any plane orthogonal to the Z direction becomes equal to the shape of the two-dimensional operation prohibition region AR2. As a result, in the example of FIG. 17, the shape of the operation prohibition region AR2' on the XY plane becomes equal to the polygonal operation prohibition region AR2.

Because the operation prohibition region AR2 is defined by the coordinate values of the position P8 and the coordinate values of the position P9 as described above, the setting device 100 converts the coordinate values of the position P8 and the coordinate values of the position P9 into those in a coordinate system representing a real space on the basis of a predetermined conversion formula and adds the height h to the coordinate system. Thereby, the setting device 100 can convert the operation prohibition region AR2 represented in the coordinate system on the user interface 140 into the operation prohibition region AR2' represented in the coordinate system on the real space.

In an exemplary embodiment, the height h of the operation prohibition region AR2' is determined on the basis of a lower limit value and an upper limit value in the Z direction. The lower limit value and the upper limit value may be preset or arbitrarily set by the user. The lower limit value corresponds to a distance from a predetermined reference plane (for example, a ground surface) on a horizontal plane to a bottom surface of the operation prohibition region AR2'. The upper limit value corresponds to a distance from the reference plane to a top surface of the operation prohibition region AR2'. However, it is not necessary to set both the lower limit value and the upper limit value and only one of the lower limit value and the upper limit value may be set.

[D. Summary of Second Embodiment]

As described above, the user interface 140 according to the present embodiment receives a setting of a polygonal operation prohibition region. Because the user can set operation prohibition regions of various shapes on the user interface 140, the operation prohibition region can be more accurately set.

Third Embodiment

[A. Overview]

The user interface 140 according to the first embodiment is configured to receive a setting of the fan-shaped operation prohibition region AR2. On the other hand, the user interface 140 according to the third embodiment is configured to receive a setting of the two-dimensional operation prohibition region AR2 by setting a boundary with respect to the operable region AR1.

Because other points such as hardware configurations of the control system 1 according' to the third embodiment are the same as those of the control system 1 according to the first embodiment, description thereof will not be repeated below.

[B. User Interface 140]

Figure 18:
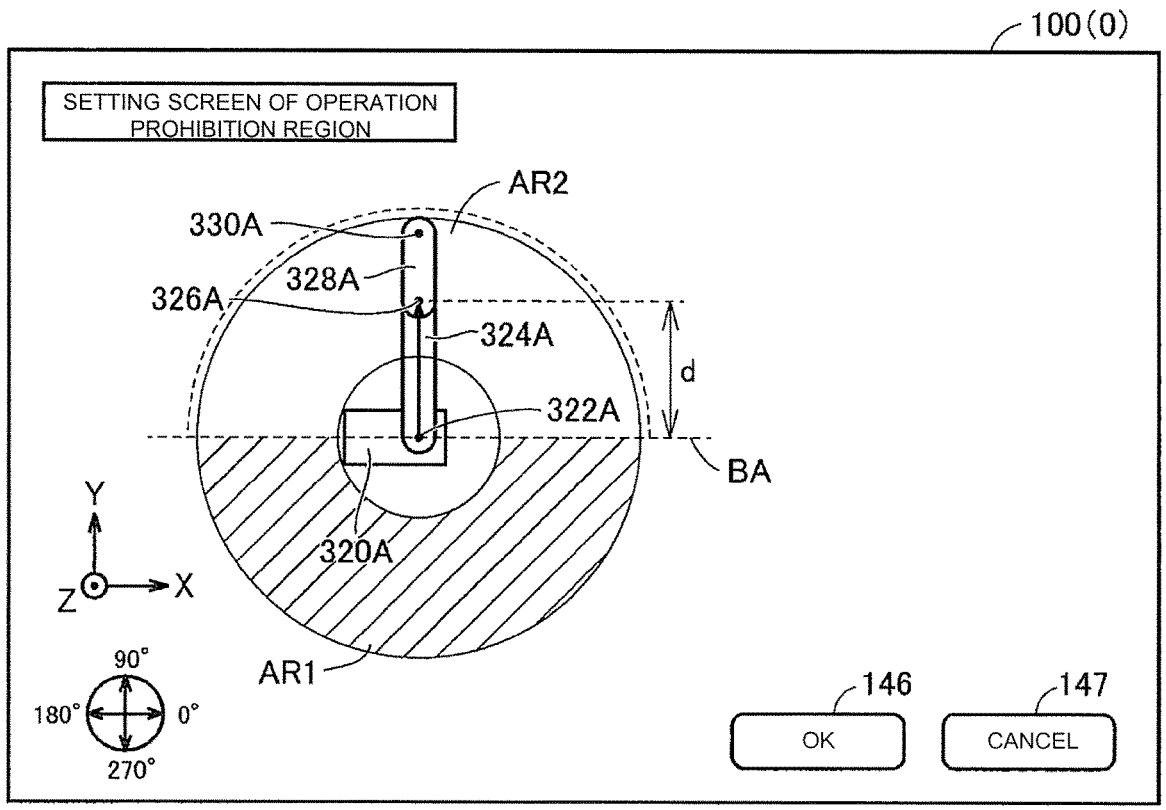
FIG. 18 is a diagram illustrating a user interface according to a third embodiment.

The user interface 140 according to the third embodiment will be described with reference to FIG. 18. FIG. 18 is a diagram illustrating the user interface 140 according to the third embodiment.

In the present embodiment, the operation prohibition region AR2 is set by setting a boundary BA with respect to the operable region AR1. Although a positive side in the Y direction of the boundary BA is set as the operation prohibition region AR2 in the example of FIG. 18, a negative side in the Y direction of the boundary BA may be set as the operation prohibition region AR2. Also, although the boundary BA is shown as a straight line in the example of FIG. 18, the boundary BA may be represented by another line such as a curve.

The position of the boundary BA is set by any method. For example, the user can move the boundary BA according to a drag operation on the boundary BA. Alternatively, the user may set the boundary BA by inputting a coordinate value in the Y direction.

On the basis of the pressing of the OK button 146 by the user, the setting device 100 stores the operation prohibition region AR2. When the cancel button 147 is pressed, the setting device 100 closes the user interface 140 without storing the two-dimensional operation prohibition region AR2.

[C. Process of Extending Operation Prohibition Region]

Figure 19:
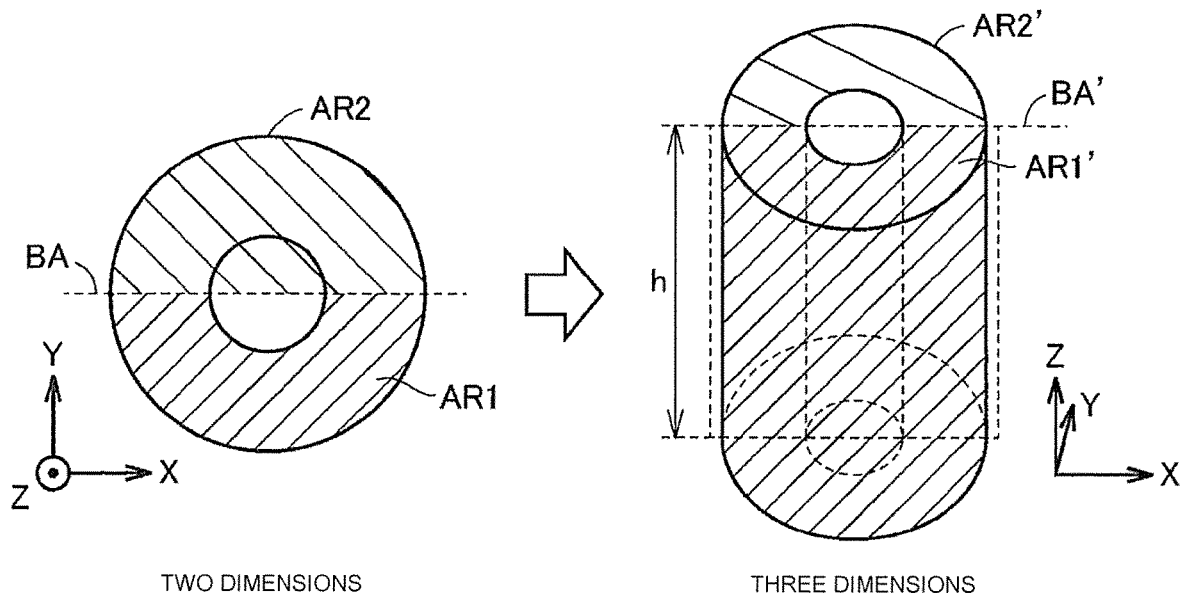
FIG. 19 is a conceptual diagram schematically illustrating a process of extending an operation prohibition region in the third embodiment.

A process of extending the two-dimensional operation prohibition region AR2 to the three-dimensional operation prohibition region AR2' will be described with reference to FIG. 19. FIG. 19 is a conceptual diagram schematically illustrating a process of extending the operation prohibition region AR2 in the third embodiment.

As illustrated in FIG. 19, the setting device 100 extends the boundary BA to a boundary BA' by extending the boundary BA in the Z direction. The negative side of the Y axis rather than the boundary BA' is set as the operable region AR1' and the positive side of the Y axis rather than the boundary BA' is set as the operation prohibition region AR2'.

In an exemplary embodiment, the height h of the operation prohibition region AR2' is determined on the basis of a lower limit value and an upper limit value in the Z direction. The lower limit value and the upper limit value may be preset or arbitrarily set by the user. The lower limit value corresponds to a distance from a predetermined reference plane (for example, a ground surface) on a horizontal plane to a bottom surface of the operation prohibition region AR2'. The upper limit value corresponds to a distance from the reference plane to a top surface of the operation prohibition region AR2'. However, it is not necessary to set both the lower limit value and the upper limit value, and only one of the lower limit value and the upper limit value may be set.

[D. Summary of Third Embodiment]

As described above, the user interface 140 according to the present embodiment receives a setting of the operation prohibition region by receiving a setting of the boundary BA. Thus, the user can set the operation prohibition region with a simpler operation.

It will be apparent to those skilled in the art that various modifications and variations can be made to the disclosed embodiments without departing from the scope or spirit of the disclosure. In view of the foregoing, it is intended that the disclosure covers modifications and variations provided that they fall within the scope of the following claims and their equivalents.

What is claimed is:

1. A control system for a robot,
   wherein the robot includes
   a first rotation shaft;
   a first arm configured to be rotatable on a plane orthogonal to the first rotation shaft around the first rotation shaft;
   a second rotation shaft arranged parallel to the first rotation shaft and provided on the first arm;
   a second arm configured to be rotatable on a plane orthogonal to the second rotation shaft around the second rotation shaft; and a main shaft configured to be drivable in a direction parallel to the second rotation shaft and provided on the second arm, wherein the control system includes a setting unit configured to provide a user interface for receiving a setting of a two-dimensional operation prohibition region with respect to a predetermined point of interest on the robot, the two-dimensional operation prohibition region corresponding to an area on a plane orthogonal to the main shaft, and wherein the control system further includes an extension unit configured to extend the two-dimensional operation prohibition region to a three-dimensional operation prohibition region by extending the two-dimensional operation prohibition region in a direction of the main shaft.

2. The control system according to claim 1, wherein a shape of the two-dimensional operation prohibition region capable of being set in the user interface includes a fan shape, and wherein the extension unit extends the two-dimensional operation prohibition region to the three-dimensional operation prohibition region so that a shape of the three-dimensional operation prohibition region on any plane orthogonal to the main shaft becomes a fan shape.

3. The control system according to claim 2, wherein the user interface is configured to receive a setting of a central angle of the fan shape.

4. The control system according to claim 1, wherein a shape of the two-dimensional operation prohibition region capable of being set in the user interface includes a polygon, and wherein the extension unit extends the two-dimensional operation prohibition region to the three-dimensional operation prohibition region so that a shape of the three-dimensional operation prohibition region on any plane orthogonal to the main shaft becomes a polygon.

5. The control system according to claim 1, wherein the extension unit determines a range of the three-dimensional operation prohibition region in a direction of the main shaft on the basis of at least one of a predetermined lower limit value in the direction of the main shaft and a predetermined upper limit value in the direction of the main shaft.

6. The control system according to claim 1, wherein the control system includes a stopping unit configured to stop driving of the robot when the predetermined point of interest is included in the three-dimensional operation prohibition region.

7. The control system according to claim 6, wherein the stopping unit stops the driving of the robot when the predetermined point of interest is not included in a predetermined operable region.

8. A setting device for setting an operation of a robot, wherein the robot includes a first rotation shaft;

a first arm configured to be rotatable on a plane orthogonal to the first rotation shaft around the first rotation shaft;

a second rotation shaft arranged parallel to the first rotation shaft and provided on the first arm;

a second arm configured to be rotatable on a plane orthogonal to the second rotation shaft around the second rotation shaft; and a main shaft configured to be drivable in a direction parallel to the second rotation shaft and provided on the second arm, wherein the setting device includes a setting unit configured to provide a user interface for receiving a setting of a two-dimensional operation prohibition region with respect to a predetermined point of interest on the robot, the two-dimensional operation prohibition region corresponding to an area on a plane orthogonal to the main shaft, and wherein the setting device further includes an extension unit configured to extend the two-dimensional operation prohibition region to a three-dimensional operation prohibition region by extending the two-dimensional operation prohibition region in a direction of the main shaft; and a communication unit configured to transmit the three-dimensional operation prohibition region to a controller of the robot.

9. A setting method of setting an operation of a robot, wherein the robot includes a first rotation shaft;

a first arm configured to be rotatable on a plane orthogonal to the first rotation shaft around the first rotation shaft;

a second rotation shaft arranged parallel to the first rotation shaft and provided on the first arm;

a second arm configured to be rotatable on a plane orthogonal to the second rotation shaft around the second rotation shaft; and a main shaft configured to be drivable in a direction parallel to the second rotation shaft and provided on the second arm, wherein the setting method includes the step of:

displaying a user interface for receiving a setting of a two-dimensional operation prohibition region with respect to a predetermined point of interest on the robot, the two-dimensional operation prohibition region corresponding to an area on a plane orthogonal to the main shaft, and wherein the setting method further includes the steps of:

extending the two-dimensional operation prohibition region to a three-dimensional operation prohibition region by extending the two-dimensional operation prohibition region in a direction of the main shaft; and transmitting the three-dimensional operation prohibition region to a controller of the robot.

10. A computer-readable storage device including a setting program for setting an operation of a robot, wherein the robot includes a first rotation shaft;

a first arm configured to be rotatable on a plane orthogonal to the first rotation shaft around the first rotation shaft;

a second rotation shaft arranged parallel to the first rotation shaft and provided on the first arm;

a second arm configured to be rotatable on a plane orthogonal to the second rotation shaft around the second rotation shaft; and a main shaft configured to be drivable in a direction parallel to the second rotation shaft and provided on the second arm, wherein the setting program causes a computer to execute the step of:

displaying a user interface for receiving a setting of a two-dimensional operation prohibition region with respect to a predetermined point of interest on the robot, the two-dimensional operation prohibition region corresponding to an area on a plane orthogonal to the main shaft, and wherein the setting program further causes the computer to execute the steps of:

extending the two-dimensional operation prohibition region to a three-dimensional operation prohibition region by extending the two-dimensional operation prohibition region in a direction of the main shaft; and transmitting the three-dimensional operation prohibition region to a controller of the robot.

\* \* \* \* \*